United States Patent
Rivaud et al.

(10) Patent No.: US 12,400,528 B2
(45) Date of Patent: Aug. 26, 2025

(54) GUIDED CABLE ASSIST OF NETWORKING HARDWARE

(71) Applicant: Ciena Corporation, Hanover, MD (US)

(72) Inventors: Daniel Rivaud, Ottawa (CA); Alex Young, Ottawa (CA); Fabien Colton, Kars (CA); Jeffrey Scott Moynihan, Cumming, GA (US)

(73) Assignee: Ciena Corporation, Hanover, MD (US)

( * ) Notice: Subject to any disclaimer, the term of this patent is extended or adjusted under 35 U.S.C. 154(b) by 187 days.

(21) Appl. No.: 17/975,739

(22) Filed: Oct. 28, 2022

(65) Prior Publication Data

US 2023/0260375 A1  Aug. 17, 2023

Related U.S. Application Data

(63) Continuation-in-part of application No. 17/670,612, filed on Feb. 14, 2022, now Pat. No. 12,323,270.

(51) Int. Cl.
*G08B 5/36* (2006.01)
*G08B 21/18* (2006.01)

(52) U.S. Cl.
CPC ............. *G08B 5/36* (2013.01); *G08B 21/18* (2013.01)

(58) Field of Classification Search
CPC ..... G02B 6/4452; G06F 1/163; G06F 1/1632; G06F 1/182; G06F 1/189; G06F 13/4068; G06F 21/31; G06F 23/35; G06F 30/18; G06F 30/20; G06F 2111/18; G06F 2113/16; G06Q 10/20; G08B 5/22; G08B 5/36; G08B 21/18; H01R 13/6658; H02G 3/0437; H02G 3/30; H04L 12/46; H04L 41/14; H04L 43/50; H04N 21/222; H04N 21/816; H05K 7/1491
USPC ......................................................... 340/652
See application file for complete search history.

(56) References Cited

U.S. PATENT DOCUMENTS

| | | | |
|---|---|---|---|
| 6,640,272 B1 * | 10/2003 | Hartwell | G06F 13/409 710/301 |
| 7,294,786 B2 * | 11/2007 | Aldereguia | G02B 6/447 174/84 R |
| 8,184,526 B2 | 5/2012 | Duncan et al. | |
| 8,417,111 B2 | 4/2013 | Moynihan et al. | |
| 8,630,315 B2 | 1/2014 | Rivaud et al. | |
| 8,776,161 B2 | 7/2014 | Gazier et al. | |
| 9,143,227 B2 | 9/2015 | Moynihan et al. | |
| 9,240,905 B2 | 1/2016 | Connolly et al. | |
| 9,426,032 B2 * | 8/2016 | Caveney | H04L 41/085 |
| 9,608,755 B2 | 3/2017 | Moynihan et al. | |

(Continued)

FOREIGN PATENT DOCUMENTS

| | | |
|---|---|---|
| CA | 2 767 373 C | 1/2016 |
| EP | 2451099 B1 | 9/2019 |

*Primary Examiner* — Stephen R Burgdorf
(74) *Attorney, Agent, or Firm* — Clements Bernard Walker; Christopher L. Bernard

(57) ABSTRACT

Systems and methods provide a guided cable assist that blinks port LEDs on the faceplate cage of modules as an indication that assists the user in cabling a system optimally from start to finish. The systems and methods include receiving a signal responsive to a first end of a cable being coupled to a first port in a system; providing an indication, wherein the indication signifies where a second end of the cable is to be coupled; and responsive to the second end of the cable being coupled, performing a validation check of the cable connection.

17 Claims, 33 Drawing Sheets

(56) References Cited

U.S. PATENT DOCUMENTS

| | | |
|---|---|---|
| 9,832,548 B2 | 11/2017 | Moynihan et al. |
| 9,836,931 B1 | 12/2017 | Rivaud et al. |
| 9,847,752 B2 | 12/2017 | Rivaud et al. |
| 10,012,811 B2 | 7/2018 | Rivaud et al. |
| 10,027,762 B2 | 7/2018 | Moynihan et al. |
| 10,063,336 B1 | 8/2018 | Moynihan et al. |
| 10,247,895 B2 | 4/2019 | Rivaud et al. |
| 10,736,227 B1 | 8/2020 | Rivaud et al. |
| 10,764,189 B1 | 9/2020 | Rivaud et al. |
| 10,855,623 B2 | 12/2020 | Estabrooks et al. |
| 2005/0099170 A1* | 5/2005 | Wilson ............... G01R 31/1272 324/66 |
| 2007/0195711 A1* | 8/2007 | Morris ................ H04L 41/12 370/254 |
| 2008/0013949 A1* | 1/2008 | Yoshikane .......... H04J 14/0227 398/50 |
| 2008/0049790 A1* | 2/2008 | Caveney ............. H04M 3/229 370/475 |
| 2008/0205377 A1* | 8/2008 | Chao ................... H04L 69/40 370/351 |
| 2011/0222266 A1* | 9/2011 | Beermann ........... H04N 5/64 362/85 |
| 2011/0286742 A1 | 11/2011 | Nichols et al. |
| 2013/0177311 A1* | 7/2013 | Trnkus ............... H04J 14/0227 398/28 |
| 2013/0242721 A1 | 9/2013 | Moynihan et al. |
| 2014/0314402 A1 | 10/2014 | Moynihan et al. |
| 2015/0023368 A1* | 1/2015 | Connolly ............ H04L 12/6402 370/420 |
| 2015/0229424 A1 | 8/2015 | Moynihan et al. |
| 2016/0044392 A1 | 2/2016 | Surek et al. |
| 2017/0214516 A1 | 7/2017 | Rivaud et al. |
| 2017/0288678 A1 | 10/2017 | Estabrooks et al. |
| 2017/0336903 A1 | 11/2017 | Rivaud et al. |
| 2018/0077080 A1 | 3/2018 | Gazier et al. |
| 2019/0268470 A1* | 8/2019 | Amir .................. G06T 11/00 |
| 2019/0327126 A1 | 10/2019 | Rivaud et al. |
| 2019/0327188 A1 | 10/2019 | Rivaud et al. |
| 2019/0327542 A1 | 10/2019 | Rivaud et al. |
| 2020/0184784 A1* | 6/2020 | Sainath ................ G08B 5/22 |
| 2020/0341218 A1 | 10/2020 | Leclair et al. |
| 2021/0210894 A1 | 7/2021 | Rivaud et al. |
| 2021/0239927 A1 | 8/2021 | Rivaud et al. |
| 2021/0243915 A1 | 8/2021 | Saturley et al. |
| 2021/0367674 A1 | 11/2021 | Leclair et al. |
| 2022/0012204 A1* | 1/2022 | Lam .................... G06F 3/0688 |

\* cited by examiner

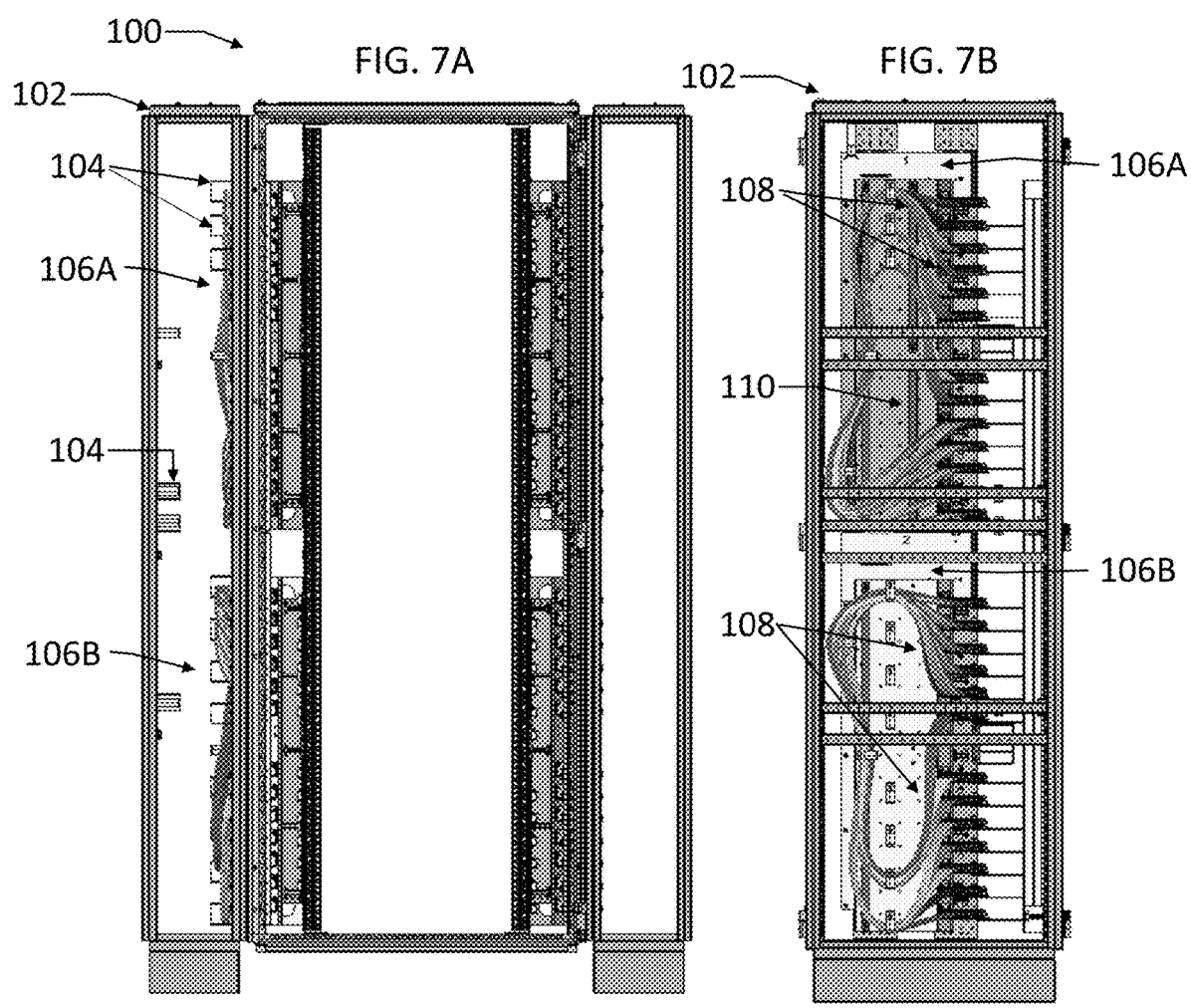

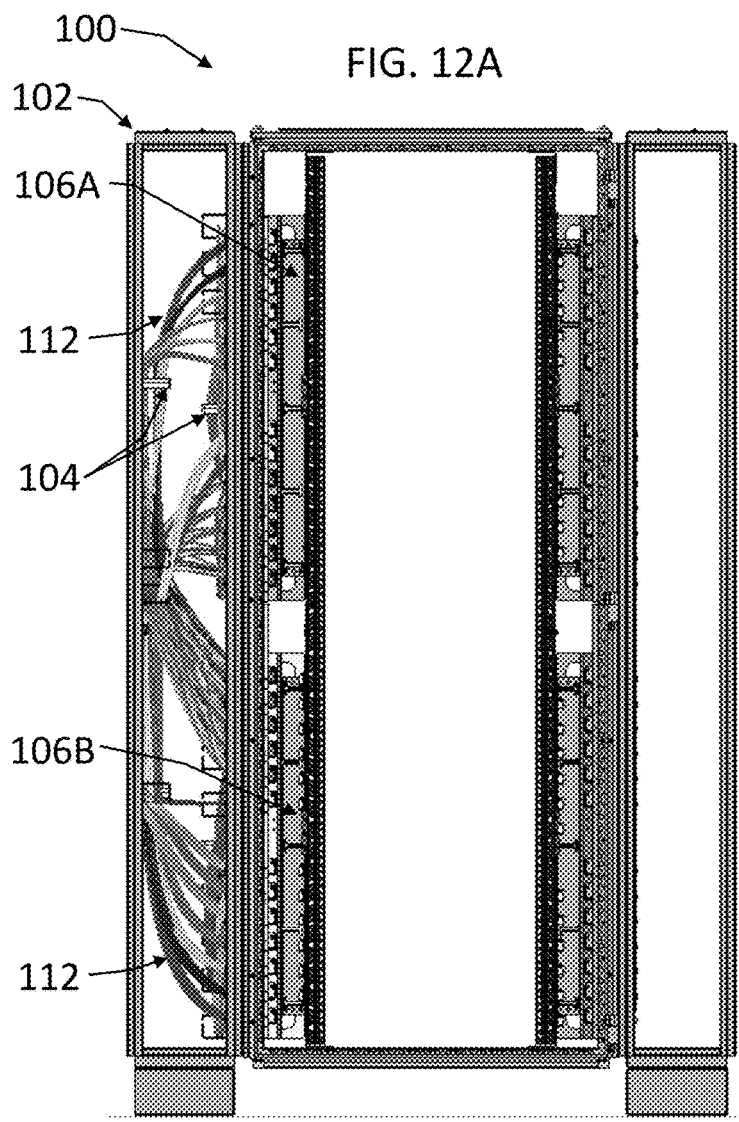
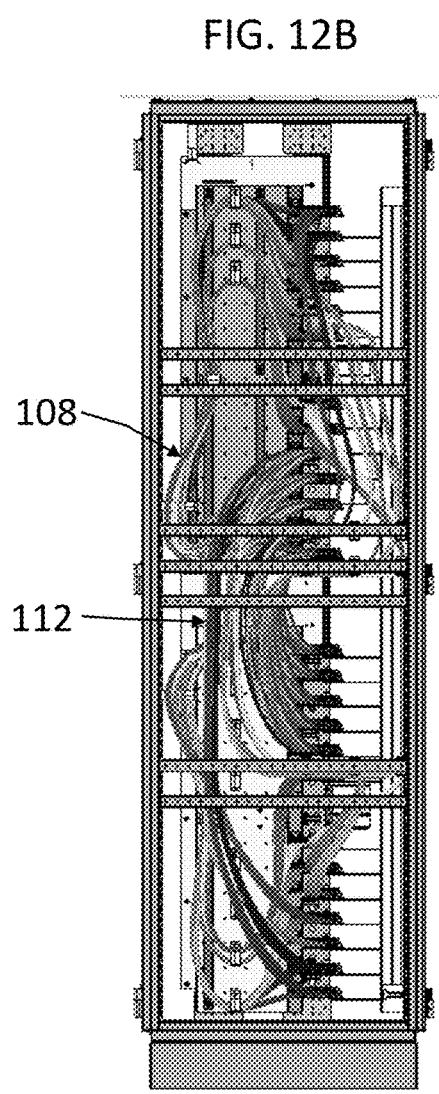

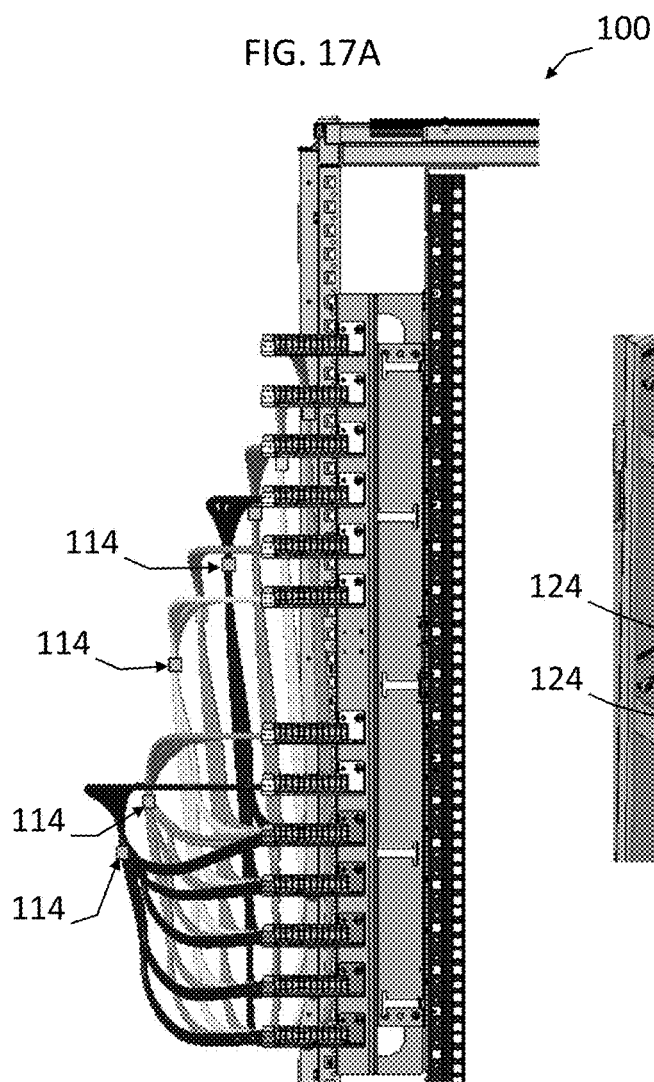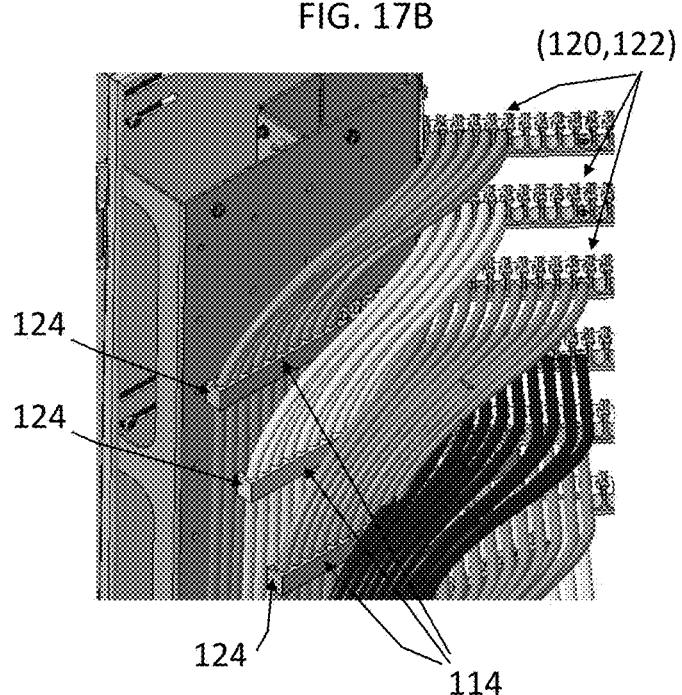

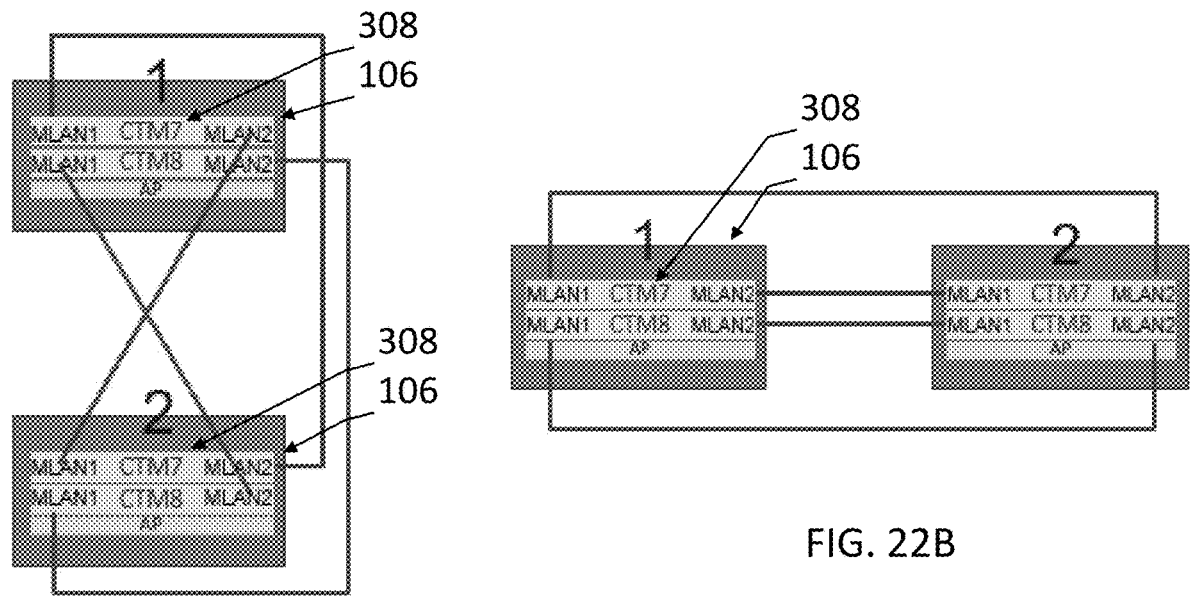
FIG. 22B
FIG. 22A
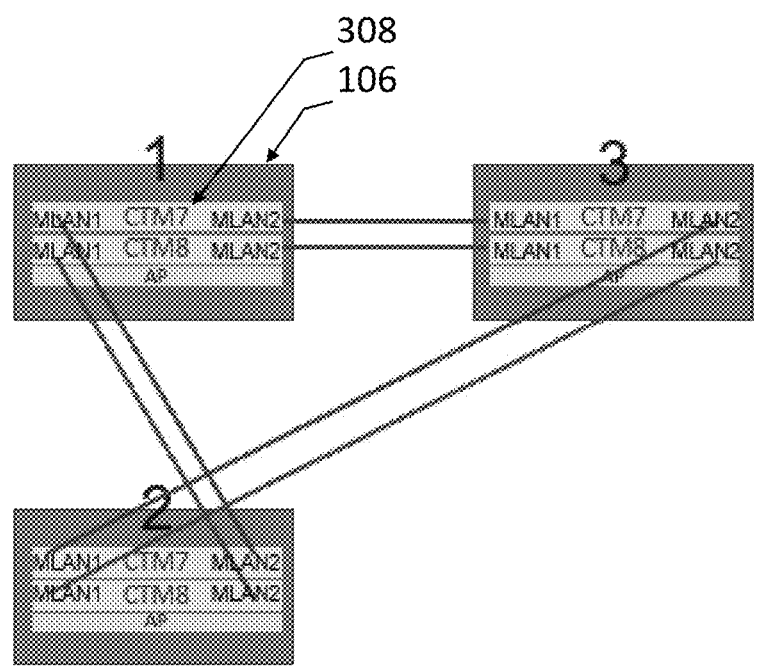
FIG. 22C

GUIDED CABLE ASSIST OF NETWORKING HARDWARE

FIELD OF THE DISCLOSURE

The present disclosure generally relates to computing hardware. More particularly, the present disclosure relates to systems and methods for guided cable assist.

BACKGROUND OF THE DISCLOSURE

Typically, network components such as servers, computing devices, routers, switches, and other components of the like are housed in a rack to organize and secure the various hardware devices. When cabling is necessary, such as during installation or maintenance, components such as network elements need to be connected to one another, resulting in a cabling challenge. When cabling a system, there is a particular order that optimizes the cabling for ease of installation, future expansion, replacement of cables, and maximizing the use of Direct Attach Cable (DAC) over Active Optical Cable (AOC), for example. Although particular cabling order is not always required, it is beneficial to use an optimal cabling system from start to finish.

BRIEF SUMMARY OF THE DISCLOSURE

In an embodiment, a method includes steps of: coupling a first end of a cable to a first port in a system; receiving an indication responsive to coupling the first end of the cable, wherein the indication signifies where a second end of the cable is to be coupled; and coupling the second end of the cable based on the indication. Responsive to the coupling of the second end of the cable, the steps further include receiving validation of a successful connection of the cable. The steps can be repeated for a plurality of cables adapted to couple modules of one or more systems. The indication can signify where the second end of the cable is to be coupled by way of Light Emitting Diodes (LEDs) disposed relative to one or more ports. The indication can be in the form of Augmented Reality (AR), wherein a user utilizes AR equipment to visualize where the ends of the cable are to be coupled. The indicating can be invoked by one of coupling the first end of the cable and by a User Interface (UI). The system can be one of a plurality of systems, and the first and second end of the cable can be coupled to different systems. The systems may be disposed in different network elements. The indication can operate based on steady state policies to indicate a plurality of situations. The indication is adapted to guide an installer through a cabling sequence to optimize cable length and optimize ease of physical cable install.

In another embodiment, a non-transitory computer-readable medium includes instructions that, when executed, cause a processor to: receive a signal responsive to a first end of a cable being coupled to a first port in a system; provide an indication, wherein the indication signifies where a second end of the cable is to be coupled; and responsive to the second end of the cable being coupled, perform a validation check of the cable connection. Responsive to the coupling of the second end of the cable, the steps further include providing validation of a successful connection of the cable. The steps are repeated for a plurality of cables adapted to couple modules of one or more systems. The indication includes illuminating Light Emitting Diodes (LEDs) disposed relative to one or more ports. The indication can be in the form of Augmented Reality (AR). The indication may be invoked by one of the coupling of the first end of the cable and by a User Interface (UI). The system can be one of a plurality of systems, and the first and second end of the cable can be coupled to different systems. The systems may be disposed in different network elements. The indication operates based on steady state policies to indicate a plurality of situations. The indication is adapted to guide an installer through a cabling sequence to optimize cable length and optimize ease of physical cable install.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7A-7B are diagrams showing a first and second system with non-expansion cables disposed within a rack.

FIG. 12A-12B are diagrams showing a first and second system with all expanded cables disposed within a rack.

FIG. 17A-17B are diagrams showing a ribbon style cable securement system of the present disclosure.

FIG. 22A-FIG. 22E show a plurality of templates for Control & Timing Module (CTM) connection topologies across a plurality of network elements.

DETAILED DESCRIPTION OF THE DISCLOSURE

Figure 1:
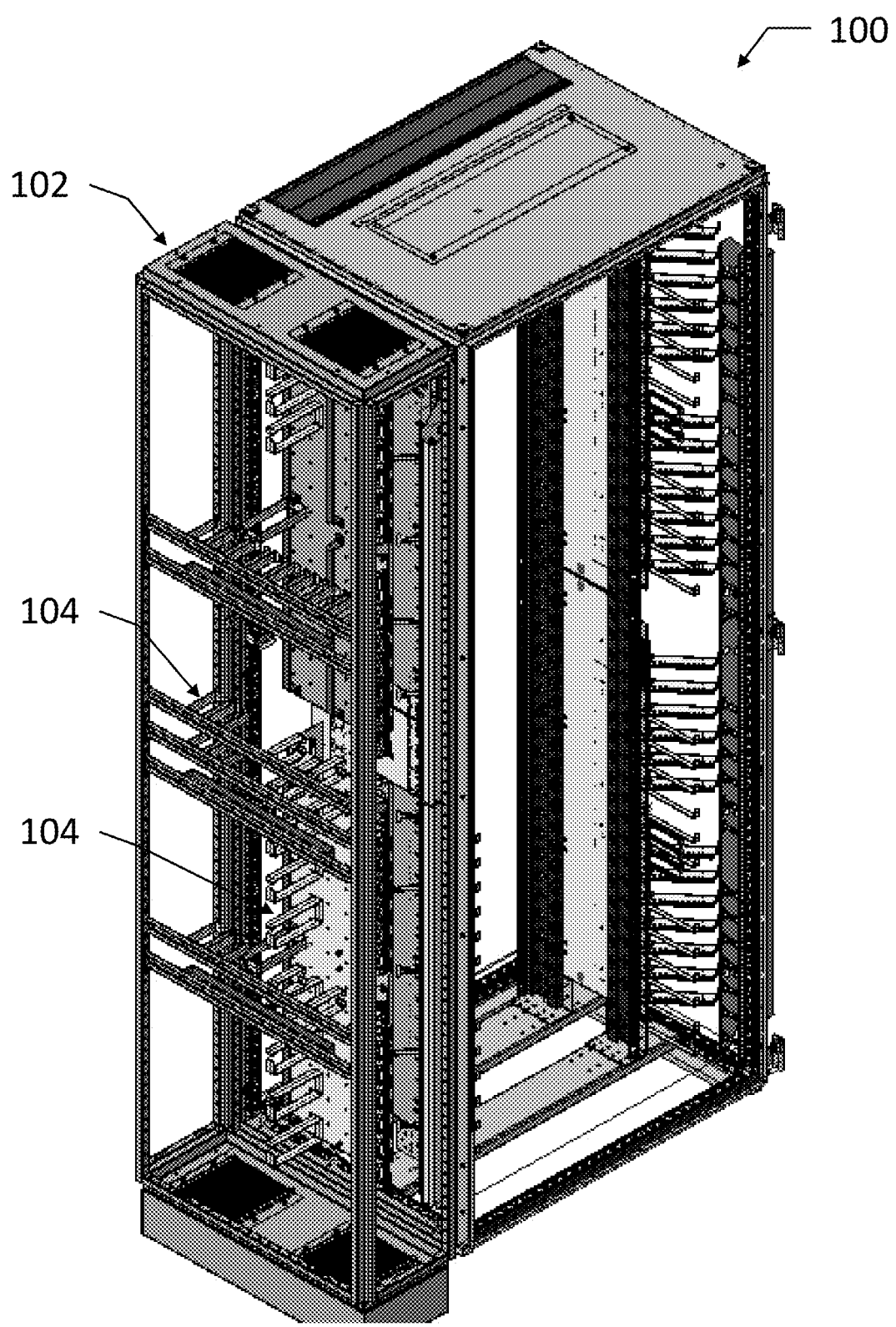
FIG. 1 is a perspective view of a rack including the cable management topology of the present disclosure.

In various embodiments, the present disclosure relates to systems and methods for cabling topology for expansion of network components such as servers, computing devices, routers, switches, and other components of the like. In various embodiments, the present disclosure provides a rack which may be coupled to a plurality of additional side racks. The racks include one or more shelves (systems), the shelves being connected via a plurality of cables each having the same length and any excess slack in the cables is managed via utilizing any of a plurality of hooks. The racks may include a plurality of systems stacked on top of each other which may be connected via the plurality of cables each having the same length and any excess slack in the cables again being managed via any of the plurality of hooks. A single or plurality of racks may be referred to as a network element.

The present disclosure provides a solution to cabling problems within network equipment racks (network elements). It will be appreciated that the racks of the present disclosure include any enclosure containing or storing active or non-active computing components, networking components, storage devices, and/or any other device or component of the like. Such devices (systems) may include servers, computing devices, routers, switches, and others of the like which connect to one another via cabling. The present invention utilized a single cable length for all connections made on the local bundles and remote bundles. The present invention allows the cables to be accessed easily such as in a rack allowing only front and rear access, while also allowing a single cable to be removed and replaced without disrupting other components or cables. In various embodiments, the system includes local bundles that connect within the housing of the rack, and remote bundles that can connect to a different rack but can also connect within the local housing. The bundles being a group of cables.

The cabling system may be split into two groups, wherein the first group of cables which are not used for expansion are secured to the right side of the cable housing and the second group of cables which are used for expansion are secured to the left side of the cable housing or the cable housing side wall. Of course, the left and right can be swapped in other embodiments. The cable housing being an enclosure on the side of the rack for storing and securing cables. In racks where multiple systems are stored, the cabling system can support both top-to-bottom and bottom-to-top expansion to allow the user a point of flexibility depending on the users particular rack setup. In order to constrain the cables to one path, hooks on both the left and right side of the cable housing are placed in particular positions. The cable combs and hooks guide the cables through the three-dimensional path through space in an optimal route as to allow the previously mentioned features. Within the local (non-expansion) and remote (expansion) cable groups, cable channels are maintained near the faceplate to facilitate the installation steps and minimize confusion when attempting to remove/replace a single cable amongst the plurality of total cables. When a cable exits the angled faceplate, the first cable support is a cable comb which has grooves for individual cables. This keeps the cables organized at the faceplate, eliminating tangles and undiscernible groups of cables.

Network Rack

FIG. 1 is a perspective view of a network rack 100 including the cable management topology of the present disclosure. The rack 100 includes a cable housing 102. The cable housing 102 includes a plurality of hooks 104, the hooks 104 adapted to secure and guide cables through the cable housing 102. The hooks are placed as to secure both the cables which will not be used in expansion and cables which will be used in expansion. The cables not used in expansion being secured by the hooks 104 on the inner side (right side) of the cable housing 102, and the cables used in expansion being secured to the outer side (left side) of the cable housing 102 by the hooks 104. This reduces the amount of cable bulk in a given area, making it much simpler to track a single cable. The plurality of cables may include any of twinaxial cables, fiber cables, and other cables of the like.

Figure 2:
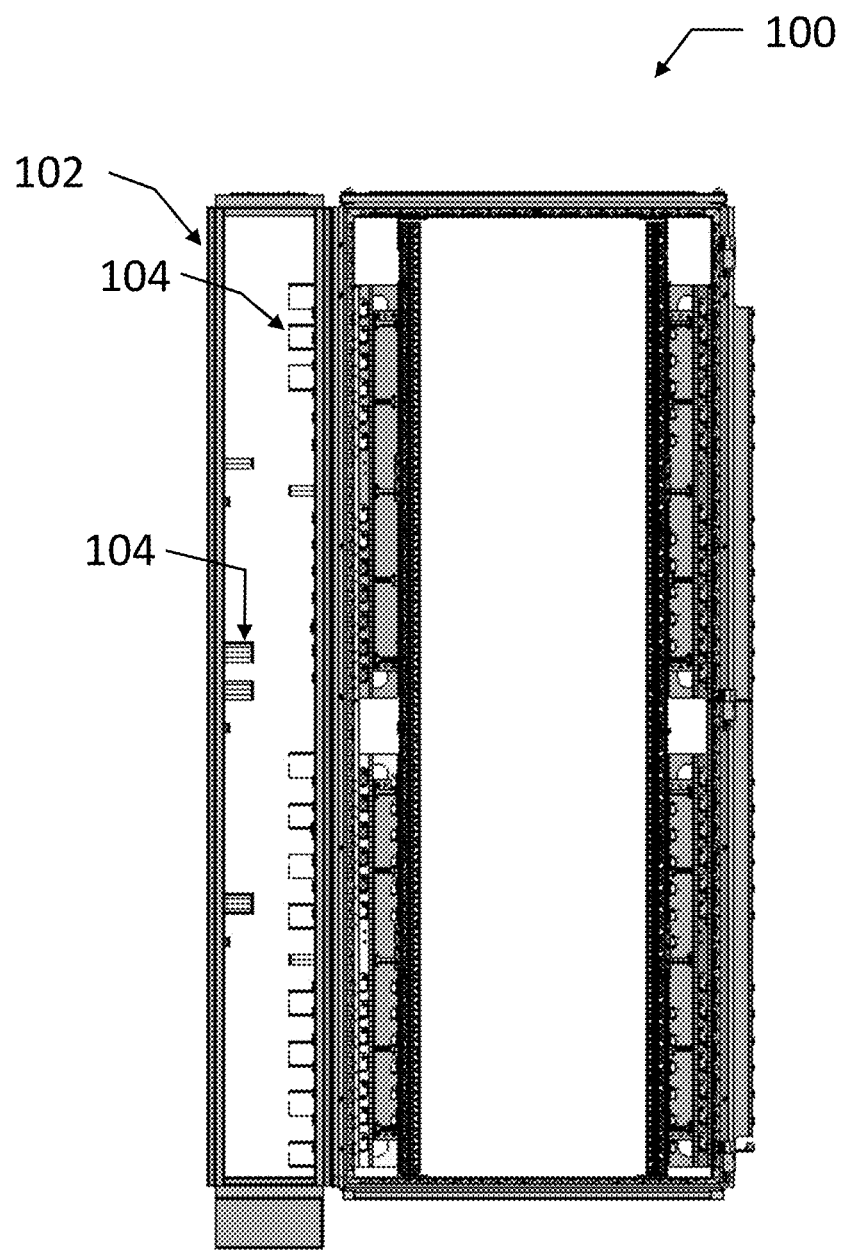
FIG. 2 is a front view of a rack including the cable management topology of the present disclosure.

FIG. 2 is a front view of a network rack 100 including the cable management topology of the present disclosure. Again, the rack 100 includes a cable housing 102. The cable housing 102 includes a plurality of hooks 104, the hooks 104 adapted to secure and guide cables through the cable housing 102.

Network Rack with Multiple Systems

Figure 3:
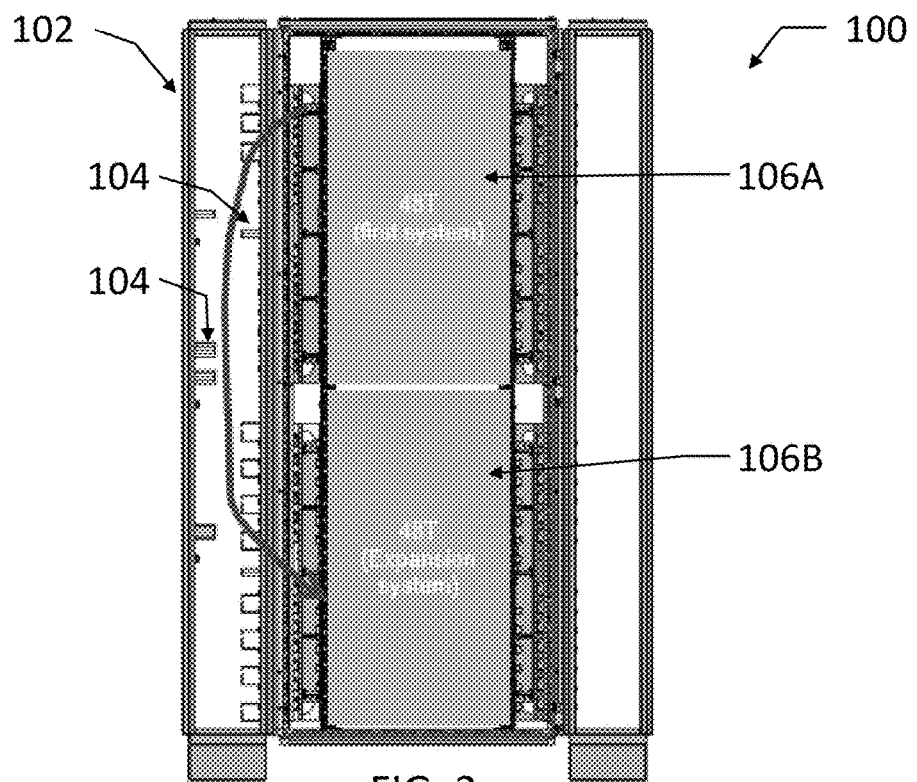
FIG. 3 is a diagram of a rack including a first system and an expansion system, both systems disposed in the same rack.

FIG. 3 is a diagram of a network rack 100 including a first system 106A and an expansion system 106B, both systems disposed in the same rack 100. The expansion shown in FIG. 3 shows how a rack 100 may include a plurality of systems, one being a first system 106A and another being an expansion system 106B (second system). In this embodiment, cables for interconnection of components in each system will be secured to the right side of the cable housing 102 via the hooks 104, and cables for connecting the first and second systems together will be secured to the left side of the cable housing 102 via the hooks 104. The expansion depicted in FIG. 3 is a top-to-bottom expansion, meaning the first system 106A is above the expansion system 106B. The expansion cables will travel from the first system 106A down to the expansion system 106B via the hooks 104 disposed on the left side (outer wall) of the cable housing 102. The cable hooks 104 guide the cables through the three-dimensional path through space in the cable housing 102 in an optimal path as to allow the cables to be accessed easily such as in a rack 100 allowing only front and rear access, while also allowing a single cable to be removed and replaced without disrupting other components or cables.

It will be appreciated that the rack 100 depicted in FIG. 3 shows a stacked system setup with the expansion system 106B below the first system 106A. In other embodiments, the systems may be in a different orientation, such as the expansion system 106B being positioned above the first system 106A. The example depicted in FIG. 3 shall be construed as a non-limiting example.

Figure 4:
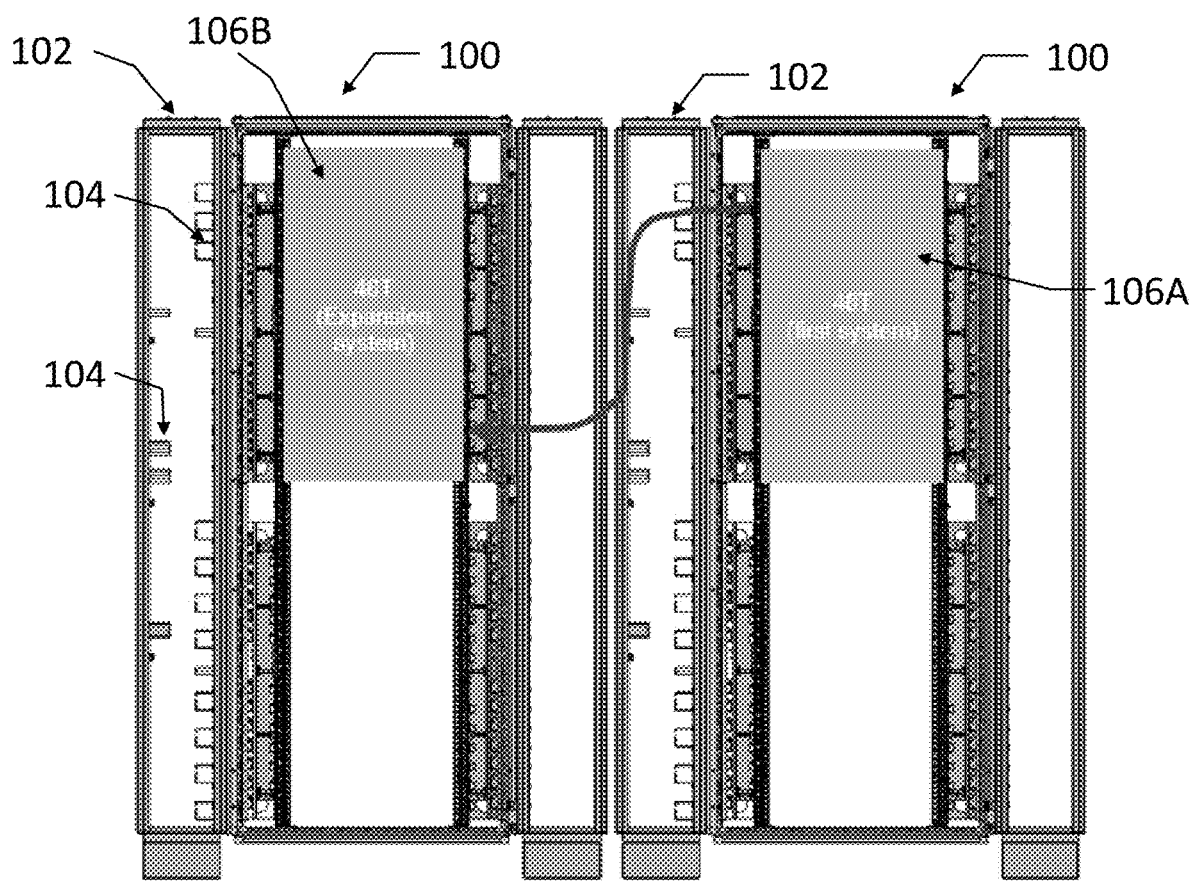
FIG. 4 is a diagram of a rack including a first system and an expansion system, both systems disposed in different racks.

FIG. 4 is a diagram of a network rack 100 including a first system 106A and an expansion system 106B, both systems disposed in different racks 100. The expansion shown in FIG. 4 shows how a plurality of racks 100 may be placed adjacent to one another and both house systems, one being a first system 106A and another being an expansion system 106B (second system) in a separate rack 100. In this embodiment, cables for interconnection of components in each system will be secured to the right side of the cable housing 102 via the hooks 104 in the rack 100 of the respective system, and cables for connecting the first 106A and second 106B systems together will be secured to the left side of the cable housing 102 via the hooks 104. The expansion depicted in FIG. 4 is an expansion including a plurality of racks 100, meaning the first system 106A is in a different rack 100 than expansion system 106B. The expansion cables will travel from the first system 106A to the expansion system 106B via the hooks 104 disposed on the left side (outer wall) of the cable housing 102. The cable hooks 104 guide the cables through the three-dimensional path through space in the cable housing 102 and to the adjacent rack 100 in an optimal path as to allow the cables to be accessed easily such as in a rack 100 allowing only front and rear access, while also allowing a single cable to be removed and replaced without disrupting other components or cables.

It will be appreciated that the plurality of racks 100 depicted in FIG. 4 shows an adjacent system setup with the expansion system 106B next to the first system 106A. In other embodiments, the systems may be in a different orientation, such as the expansion system 106B being positioned on a different side than the first system 106A. The example depicted in FIG. 4 shall be construed as a non-limiting example.

Cable Topology

Figure 5A:
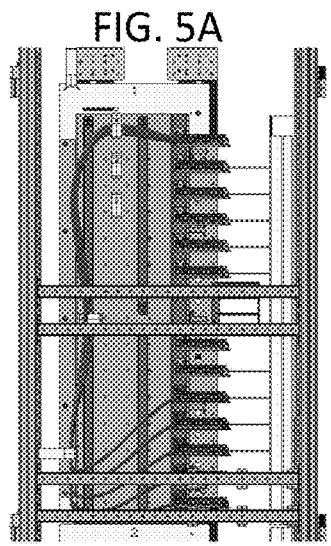
FIG. 5A-5H are diagrams showing the connection of the non-expansion cables on a first system disposed within a rack.
Figure 5B:
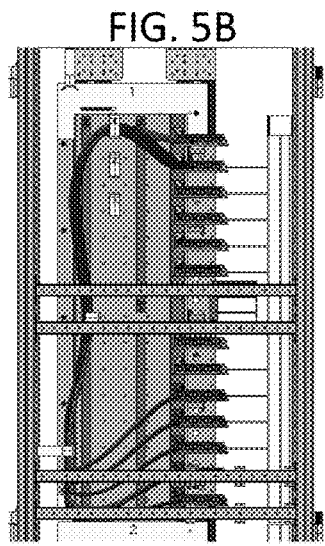
Figure 5C:
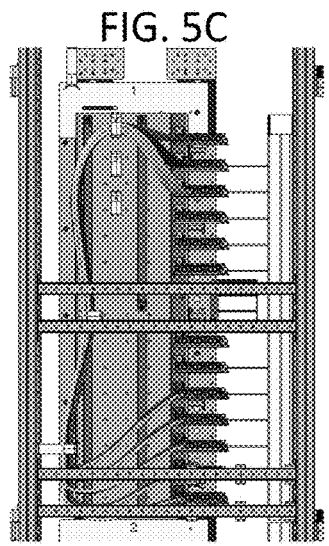
Figure 5D:
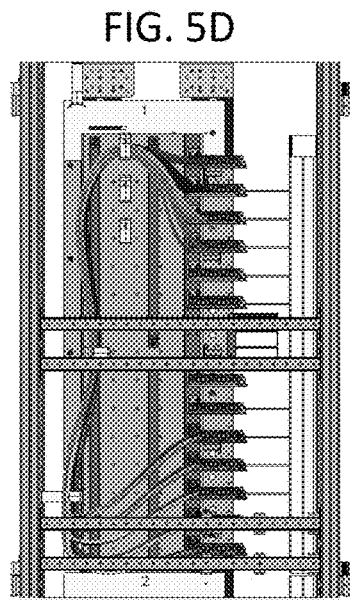
Figure 5E:
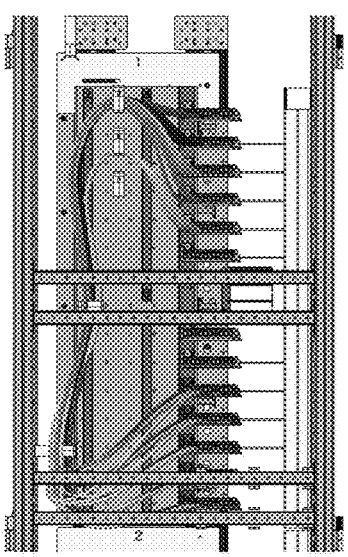
Figure 5F:
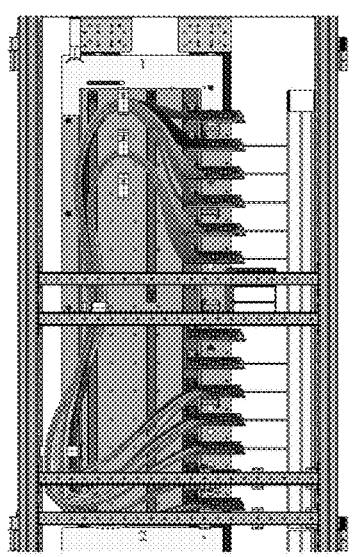
Figure 5G:
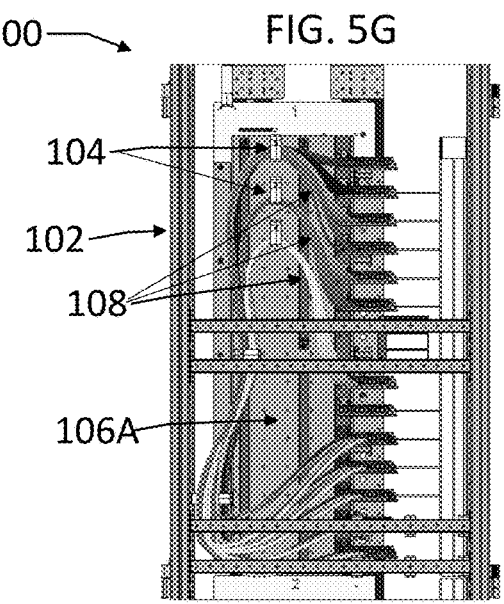
Figure 5H:
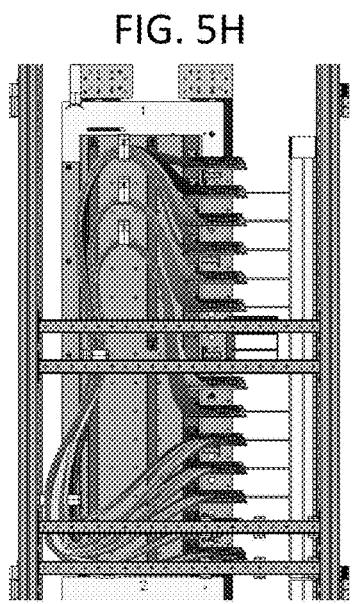

FIG. 5A-5H are diagrams showing the connection of the non-expansion cables 108 on a first system disposed within a cable housing 102 of a rack 100. Each of these non-expansion cables 108 may be a bundle of cables or a single cable. The view is a side view, displaying the side of the cable housing 102. FIG. 5A is a first system 106A including one set of non-expansion cables 108 and FIG. 5H is the same first system 106A including all of the non-expansion cables 108. Thus, FIG. 5A-5H each show the addition of a set of non-expansion cables 108 and how they are routed through the cable housing 102 via the plurality of hooks 104. All of the non-expansion cables 108 are the same length as to simplify the supply and maintenance of the system as a whole. In order to constrain the non-expansion cables 108 to one path, the hooks 104 on the right side (the side closest to the system 106A) of the cable housing 102 are placed in particular positions. The cable hooks 104 guide the non-expansion cables 108 through the three-dimensional path in an optimal route as to allow the non-expansion cables 108 to be accessed easily.

By splitting up the non-expansion cables 108 from the expansion cables 112 (FIG. 8A-8H) into different sides of the cable housing 102, congestion is reduced to aid in cable access. This is crucial in cases where the removal and replacement of a cable must be performed due to a cable failure. In addition to the hooks 104 used to rout the cables, cable tie downs may also be utilized to further secure and route the cables into the desired path and destination, the tie downs being integrated into the hooks 104 or separate components.

Figure 6A:
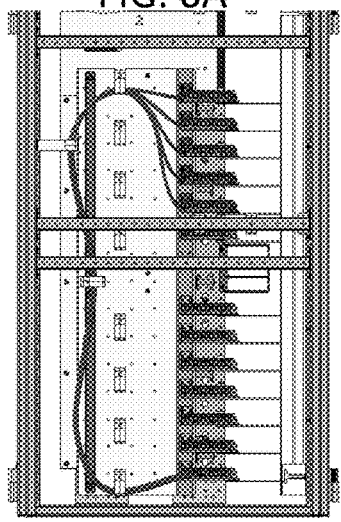
FIG. 6A-6H are diagrams showing the connection of the non-expansion cables on a second system disposed within a rack.
Figure 6B:
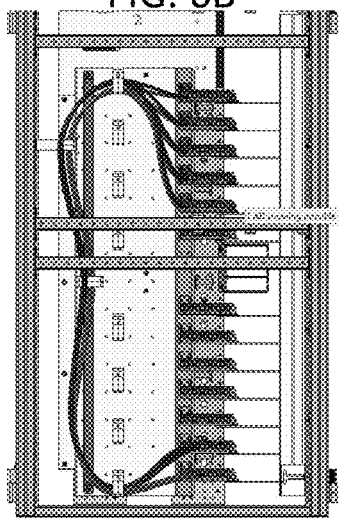
Figure 6C:
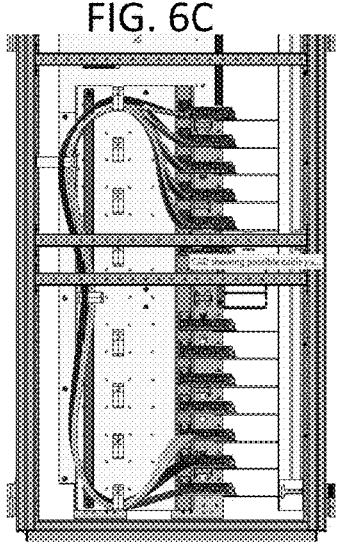
Figure 6D:
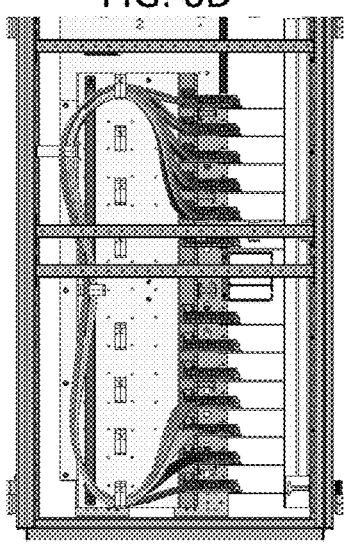
Figure 6E:
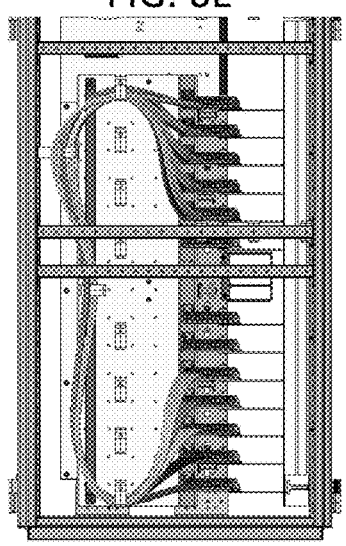
Figure 6F:
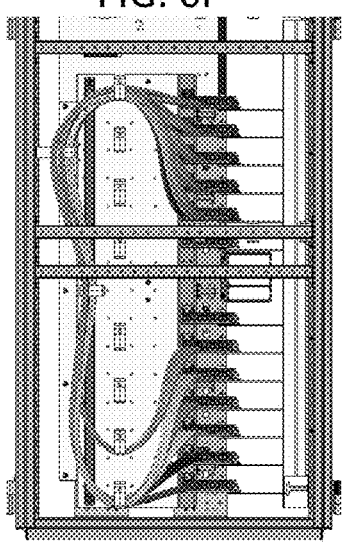
Figure 6G:
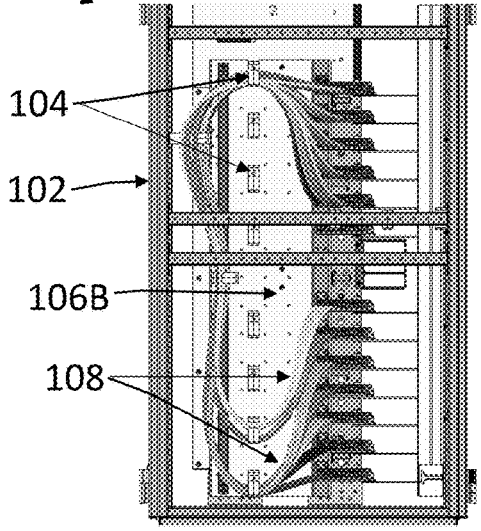
Figure 6H:
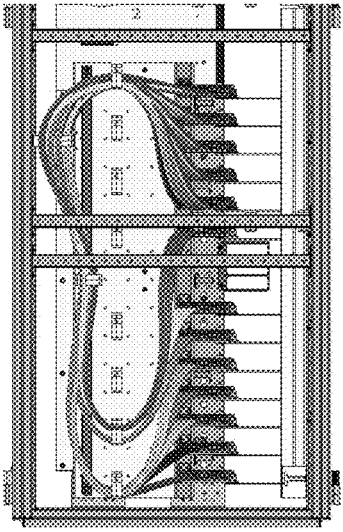

FIG. 6A-6H are diagrams showing the connection of the non-expansion cables 108 on an expansion system 106B disposed within a cable housing 102 of a rack 100. The cable housing 102 of the rack 100 is the same cable housing 102 as shown in FIG. 5A-5H, representing a stacked expanded rack 100 as described in FIG. 3. The expansion system 106B is disposed below the first system 106A. The view shown is a side view, displaying the side of the cable housing 102. FIG. 6A is the expansion system 106B including one set of non-expansion cables 108 and FIG. 6H is the same expansion system 106B including all of the non-expansion cables 108. Thus, FIG. 6A-6H each show the addition of a set of non-expansion cables 108 and how they are routed through the cable housing 102 via the plurality of hooks 104. Again, all of the non-expansion cables 108 are the same length as to simplify the supply and maintenance of the system as a whole. In order to constrain the non-expansion cables 108 to one path, the hooks 104 on the right side (the side closest to the system 106B) of the cable housing 102 are placed in particular positions. The cable hooks 104 guide the non-expansion cables 108 through the three-dimensional path in an optimal route as to allow the non-expansion cables 108 to be accessed easily in the case of necessary maintenance or other tasks.

Again, by splitting up the non-expansion cables 108 from the expansion cables 112 (FIG. 8A-8H) into different sides of the cable housing 102 on both the first system 106A and the expansion system 106B, congestion is reduced to aid in cable access. This is crucial in cases where the removal and replacement of a cable must be performed due to a cable failure. In addition to the hooks 104 used to route the cables, cable tie downs may also be utilized to further secure and route the cables into the desired path and destination, the tie downs being integrated into the hooks 104 or separate components.

FIG. 7A-7B are diagrams showing a first system 106A and an expansion system 106B with non-expansion cables 108 disposed within a cable housing 102 of a rack 100. FIG. 7A shows a front view of the rack 100 and the cable housing 102. FIG. 7B shows a side view of the cable housing 102 including all of the non-expansion cables 108 disposed within. The non-expansion cables 108 can be seen secured to the right side (the side closer to the system) of the cable housing 102. The hooks 104 on the right side of the cable housing 102 are used to secure and guide the non-expansion cables 108, allowing all of the cables to be the same length by taking up the slack of the cables with the hooks 104.

In various embodiments, the cable housing 102 may further include a plurality of tie down bars 110 to further secure the cables to the system. Additional hooks 104 may be positioned in further locations to take up any additional slack in the cables. It will be appreciated that the rack 100 depicted in FIG. 7 shows a stacked system setup with the expansion system 106B below the first system 106A. In other embodiments, the systems may be in a different orientation, such as the expansion system 106B being positioned above the first system 106A or the expansion system 106B being located in a separate rack 100 positioned adjacent to the first rack 100. The example depicted in FIG. 7 shall be construed as a non-limiting example.

Figure 8A:
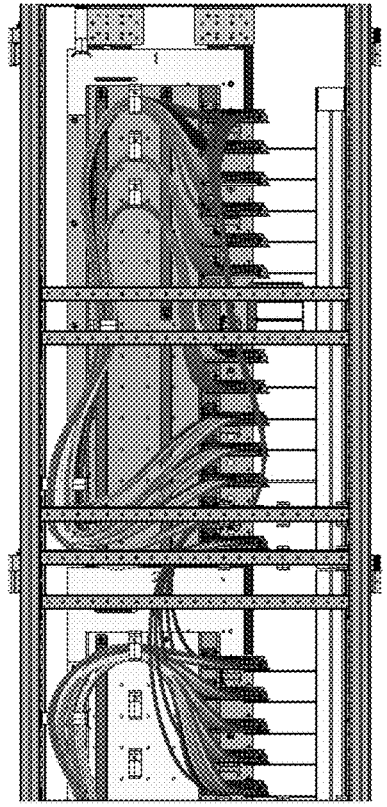
FIG. 8A-8H are diagrams showing the connection of expanded cables on a first and second system disposed within a rack.
Figure 8B:
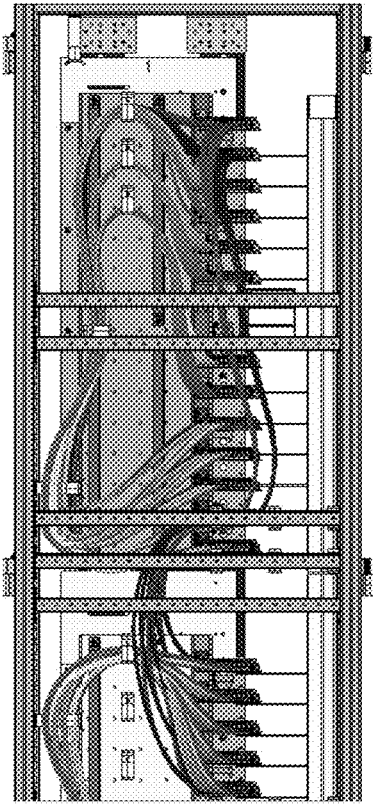
Figure 8C:
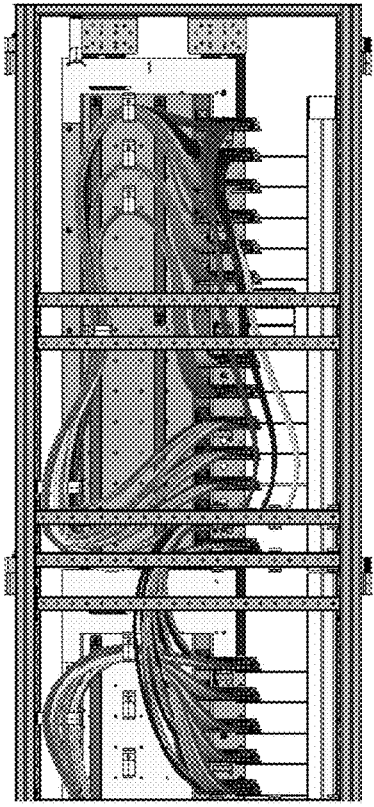
Figure 8D:
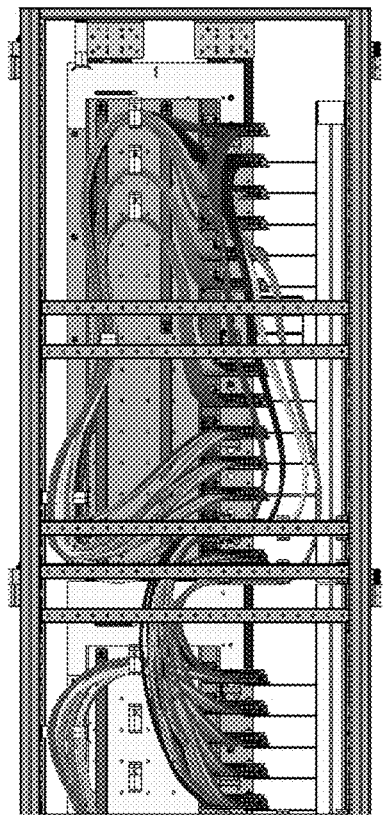
Figure 8E:
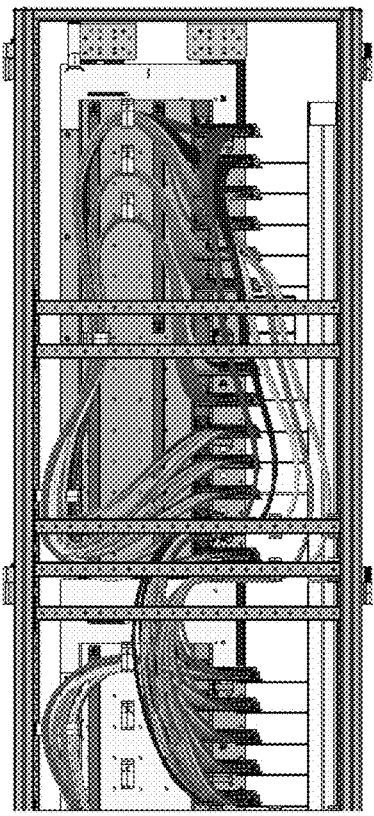
Figure 8F:
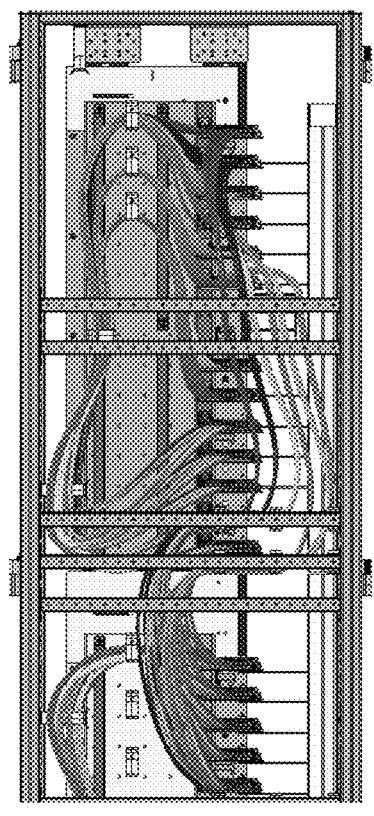
Figure 8G:
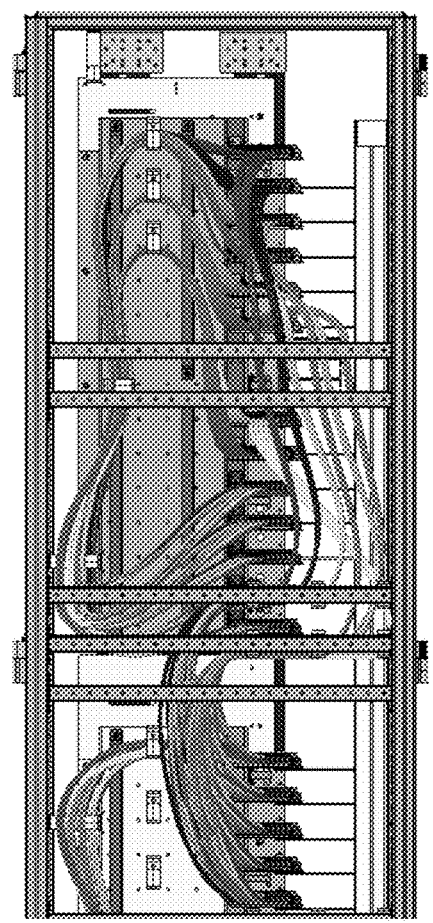
Figure 8H:
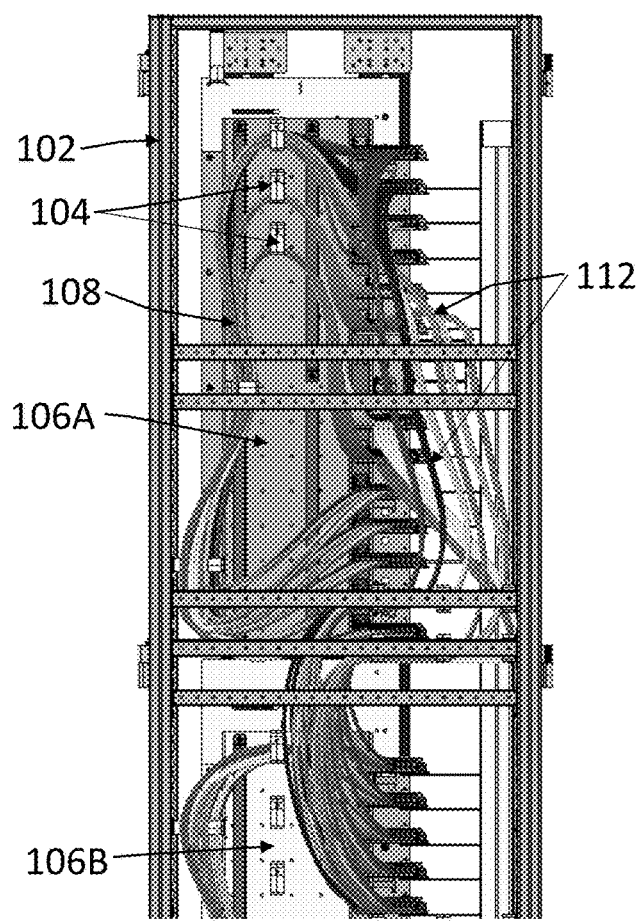

FIG. 8A-8H are diagrams showing the connection of expansion cables 112 on a first system 106A and second (expansion) system 106B disposed within a cable housing 102 of a rack 100. Each of these expansion cables 108 may be a bundle of cables or a single cable. The cable housing 102 of the rack 100 represents a stacked expanded rack 100 as described in FIG. 3. The expansion system 106B is disposed below the first system 106A. The view shown is a side view, displaying the side of the cable housing 102 of the rack 100. FIG. 8A shows one set of expansion cables 112 connecting the first system 106A to the expansion system 106B. FIG. 8H shows all of the expansion cables 112 connecting the first system 106A to the expansion system 106B, thus FIG. 8A-8H each show the addition of a set of expansion cables 112 and how they are routed through the cable housing 102 via the plurality of hooks 104.

In various embodiments, the expansion cables 112 are all of the same length to simplify the system and the supply of parts. Further, the expansion cables 112 may be the same length as the non-expansion cables 108 to further simplify the system. Again, any slack of the expansion cables 112 and non-expansion cables 108 is managed by the plurality of hooks 104 and tie down bars 110. It shall be appreciated that the example expansion shown in FIG. 8A-8H is a depiction of a stacked expansion. Various embodiments may include an expansion system 106B disposed in a different rack 100, being coupled via the expansion cables 112. Further, various embodiments may include a plurality of expansion systems 106B, disposed in both the same rack 100 and different racks 100.

Figure 9:
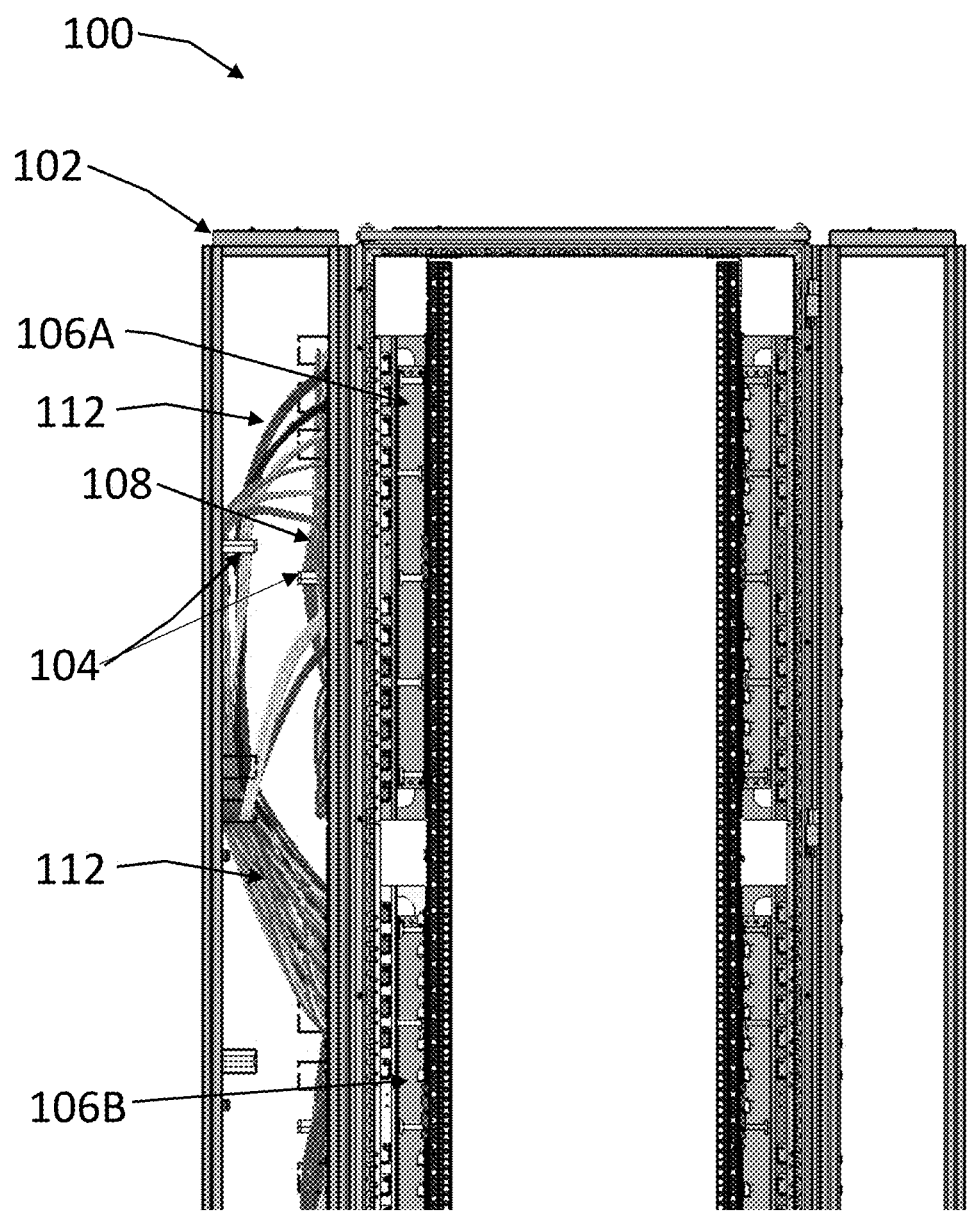
FIG. 9 is a diagram showing a first and second system with expanded cables disposed within a rack.

FIG. 9 is a diagram showing a first 106A and second 106B system with expansion cables 112 disposed within a rack 100. A cable housing 102 houses both the non-expansion cables 108 and the expansion cables 112. The expansion cables 112 are secured and routed along the left (outer side) side of the cable housing 102 while the non-expansion cables 108 are routed and secured to the right side (side closer to the system 106A and 106B) of the cable housing 102 via the plurality of hooks 104. Again, by splitting up the non-expansion cables 108 from the expansion cables 112 into different sides of the cable housing 102, congestion is reduced to aid in cable access and cable maintenance.

Figure 10A:
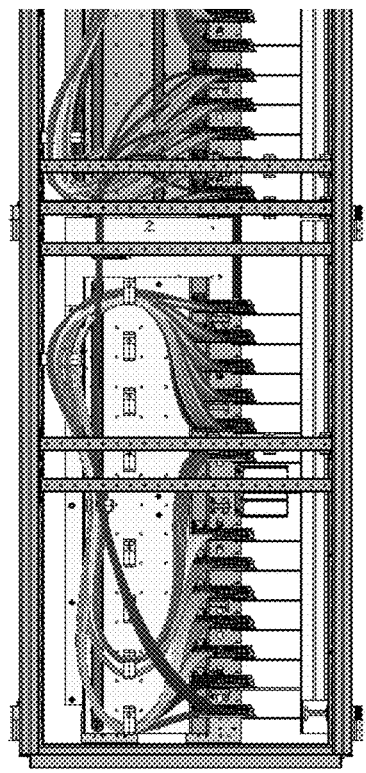
FIG. 10A-10H are diagrams showing the connection of expanded cables on a first and second system disposed within a rack.
Figure 10B:
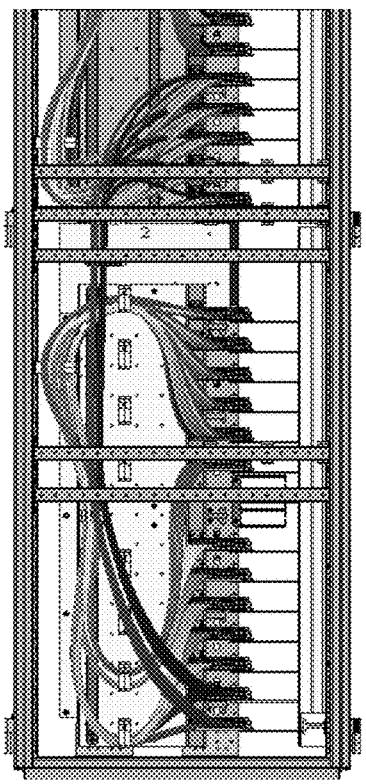
Figure 10C:
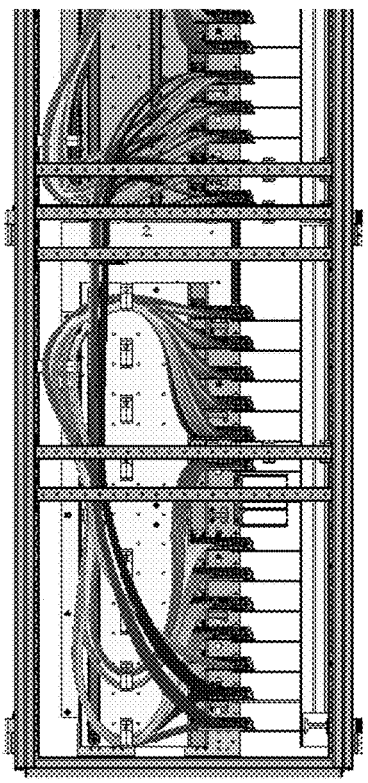
Figure 10D:
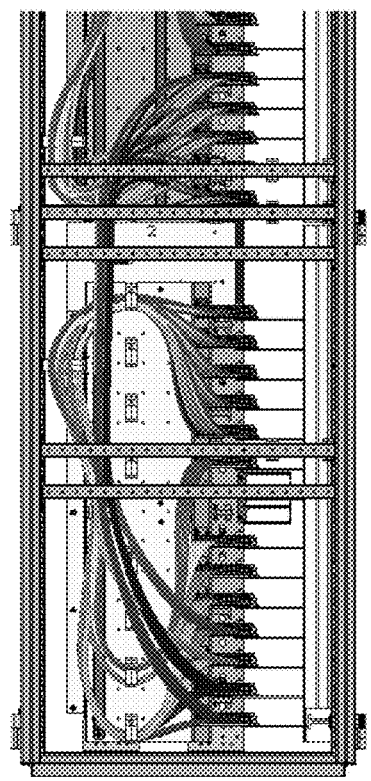
Figure 10E:
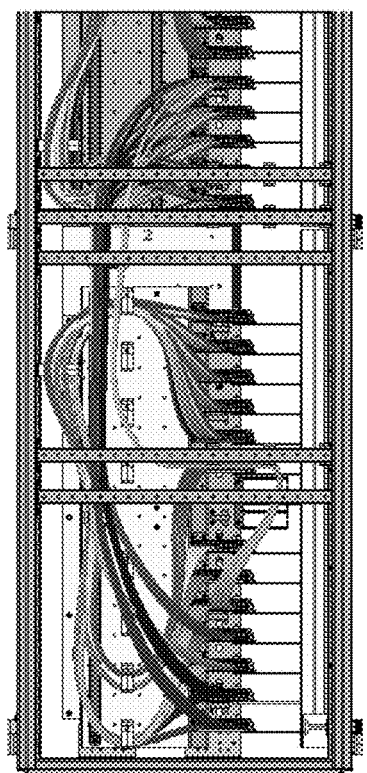
Figure 10F:
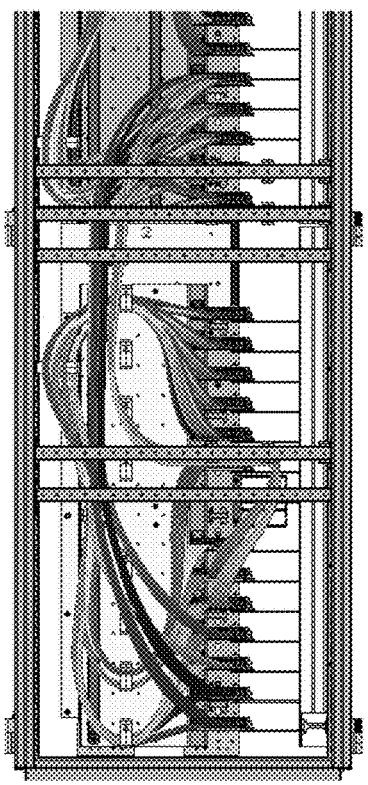
Figure 10G:
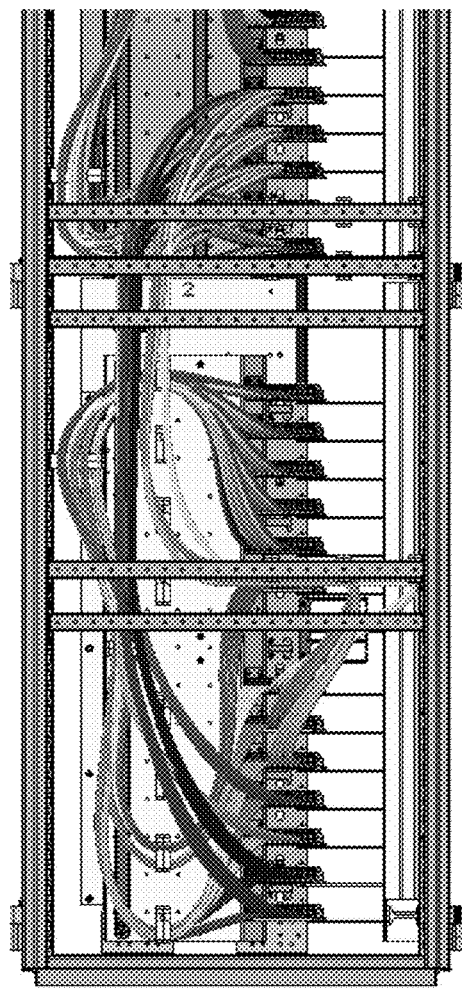
Figure 10H:
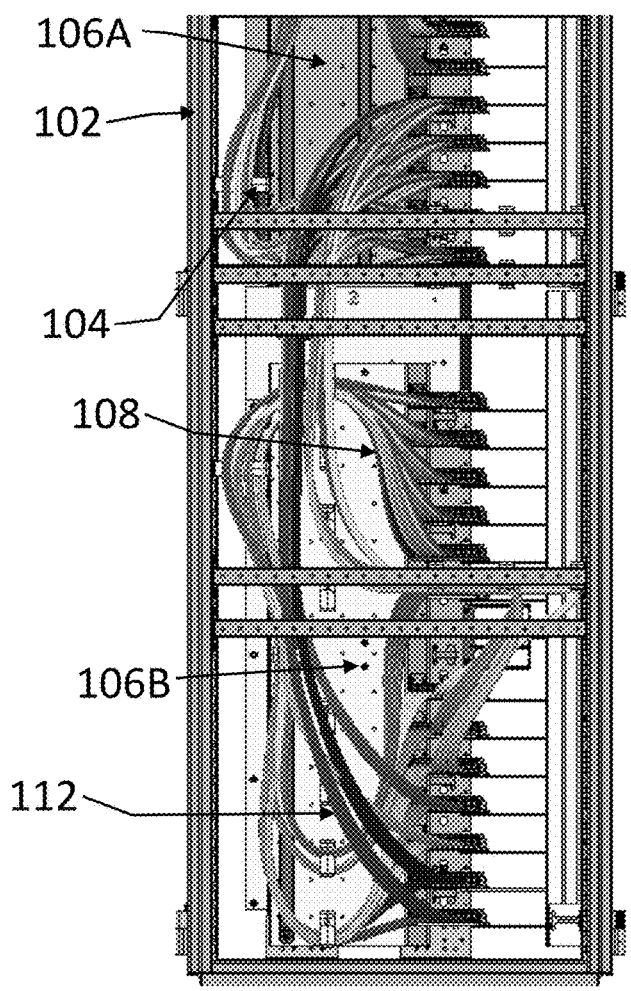

FIG. 10A-10H are diagrams showing the connection of additional expansion cables 112 on a first system 106A and second (expansion) system 106B disposed within a cable housing 102 of a rack 100. The view shown is a side view, displaying the side of the cable housing 102 of the rack 100. FIG. 10A shows one set of additional expansion cables 112 connecting the expansion system 106B to the first system 106A. FIG. 10H shows all of the additional expansion cables 112 connecting the expansion system 106B to the first system 106A, thus FIG. 10A-10H each show the addition of a set of expansion cables 112 and how they are routed through the cable housing 102 via the plurality of hooks 104 in a stacked expansion setup.

Again, in various embodiments, the expansion cables 112 are all of the same length to simplify the system and the supply of parts. Further, the expansion cables 112 may be the same length as the non-expansion cables 108 to further simplify the system and the maintenance of the system by only requiring a single cable length for any cable replacement.

Figure 11:
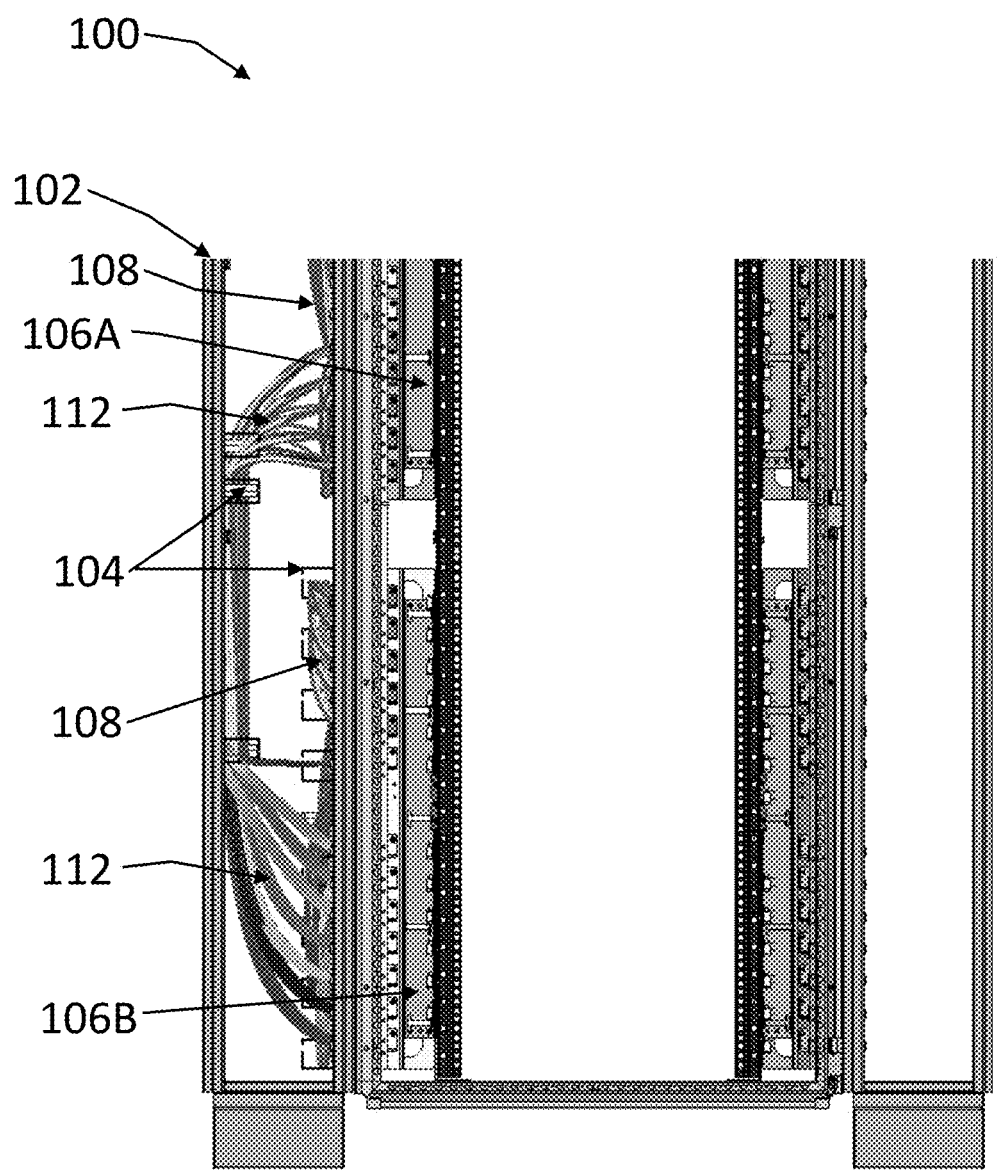
FIG. 11 is a diagram showing a first and second system with expanded cables disposed within a rack.

FIG. 11 is a diagram showing a first 106A and second 106B system with expansion cables 112 disposed within a rack 100. The view being the bottom portion of the rack 100 displaying a second group of expansion cables 112. The cable housing 102 houses both the non-expansion cables 108 and the expansion cables 112. The expansion cables 112 are secured and routed along the left (outer side) side of the cable housing 102 while the non-expansion cables 108 are routed and secured to the right side (side closer to the system 106A, 106B) of the cable housing 102 via the plurality of hooks 104 similarly to the upper portion of the cable housing 102. Again, by splitting up the non-expansion cables 108 from the expansion cables 112 into different sides of the cable housing 102, congestion is reduced to aid in cable access and cable maintenance.

FIG. 12A-12B are diagrams showing a first 106A and second 106B system with all expansion cables 112 and non-expansion cables 108 disposed within a cable housing 102 of a rack 100. FIG. 12A shows a front view of the rack 100 and the cable housing 102. FIG. 12B shows a side view of the cable housing 102 including all of the non-expansion cables 108 and expansion cables 112 coupling the systems (106A, 106B). The non-expansion cables 108 can be seen secured to the right side (the side closer to the system) of the cable housing 102 as shown in previous FIG. 11 and FIG. 9, thus being secured out of the way of the expansion cables 112. The hooks 104 on the right side of the cable housing 102 are used to secure and guide the non-expansion cables 108, allowing all of the cables to be the same length by taking up the slack of the cables with the hooks 104. The expansion cables 112 can be seen secured to the left side (the outer side) of the cable housing 102. The hooks 104 on the left side of the cable housing 102 are used to secure and guide the expansion cables 112. In various embodiments, the expansion cables 112 and the non-expansion cables 108 are all of the same length, thus greatly reducing the complexity and supply for maintenance.

In various embodiments, the cable housing 102 may further include a plurality of tie down bars 110 to further secure the cables to the system. Additional hooks 104 may be positioned in further locations to take up any additional slack in the cables (non-expansion cables 108 and expansion cables 112). It will be appreciated that the rack 100 depicted in FIG. 12 shows another stacked system setup with the expansion system 106B below the first system 106A. In other embodiments, the systems may be in a different orientation, such as the expansion system 106B being positioned above the first system 106A or the expansion system 106B being located in a separate rack 100 positioned adjacent to the first rack 100. The example depicted in FIG. 12 shall be construed as a non-limiting example.

Figure 13:
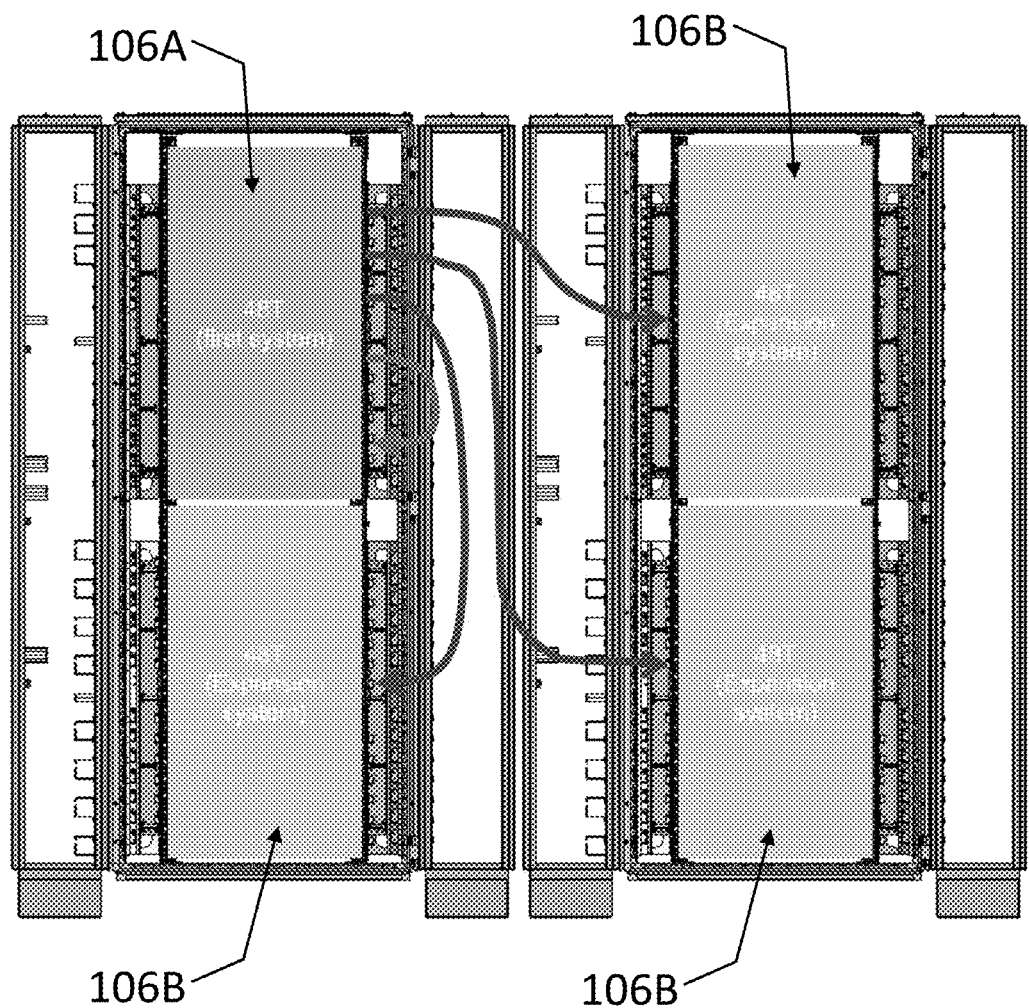
FIG. 13 is a diagram showing a combination of system expansions including a same rack expansion and an additional rack expansion.

FIG. 13 is a diagram showing a combination of system expansions including a same rack expansion (vertical expansion) and an additional rack expansion (horizontal expansion). Various embodiments of the cabling topology system of the present disclosure can accommodate different expansion schemes such as the vertical expansion and horizontal expansion shown in FIG. 13. The expansion cables 112 are used to couple the various expansion systems 106B to the first system 106A, all of the cables being the same length. The cable topology system of the present disclosure utilizes cables of the same length, no matter the expansion type, to simplify cable management and maintenance by managing cable slack with the plurality of hooks 104 and tie down bars 110.

Figure 14:
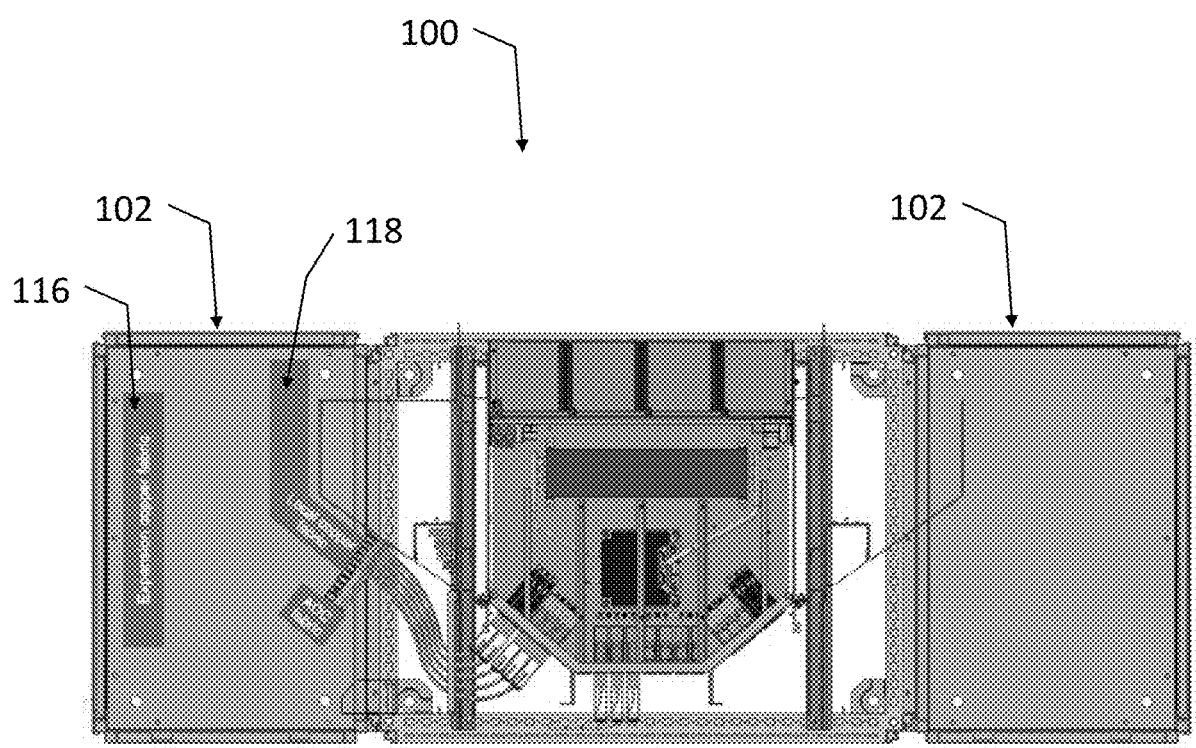
FIG. 14 is a top view diagram of a rack including the cable management topology of the present disclosure.

FIG. 14 is a top view diagram of a rack including the cable management topology of the present disclosure. The view shown in FIG. 14 demonstrates the separation between the non-expansion cables 108 and the expansion cables 112 in the cable housing 102 of the rack 100. The non-expansion cables 108 and the expansion cables 112 are secured and routed by the plurality of hooks 104 and/or combs 114 (FIG. 15), both of which allow the cables to be accessed individually without interruption of other cables, allowing a user to replace any cable in the system with ease. The different cables are separated into different zones including the expansion zone 116 and the local zone 118. The expansion zone 116 being the space allocated for the expansion cables 112, and the local zone 118 being the space allocated for the non-expansion cables 108. As stated herein, the expansion zone 116 is located on the left side (outer side) of the cable housing 102, while the local zone 118 is located on the right side (side closest to the system 106A, 106B) of the cable housing 102.

The rack 100 shown in FIG. 14 also shows a system (106A, 106B) disposed in the rack 100. Such systems (devices) may include servers, computing devices, routers, switches, and others of the like. The rack 100 further includes a second cable housing 102 on the right side as shown in FIG. 14. The second cable housing 102 may be utilized if an expansion system is located on the right side of the rack 100, similar to the depiction in FIG. 13.

Figure 15:
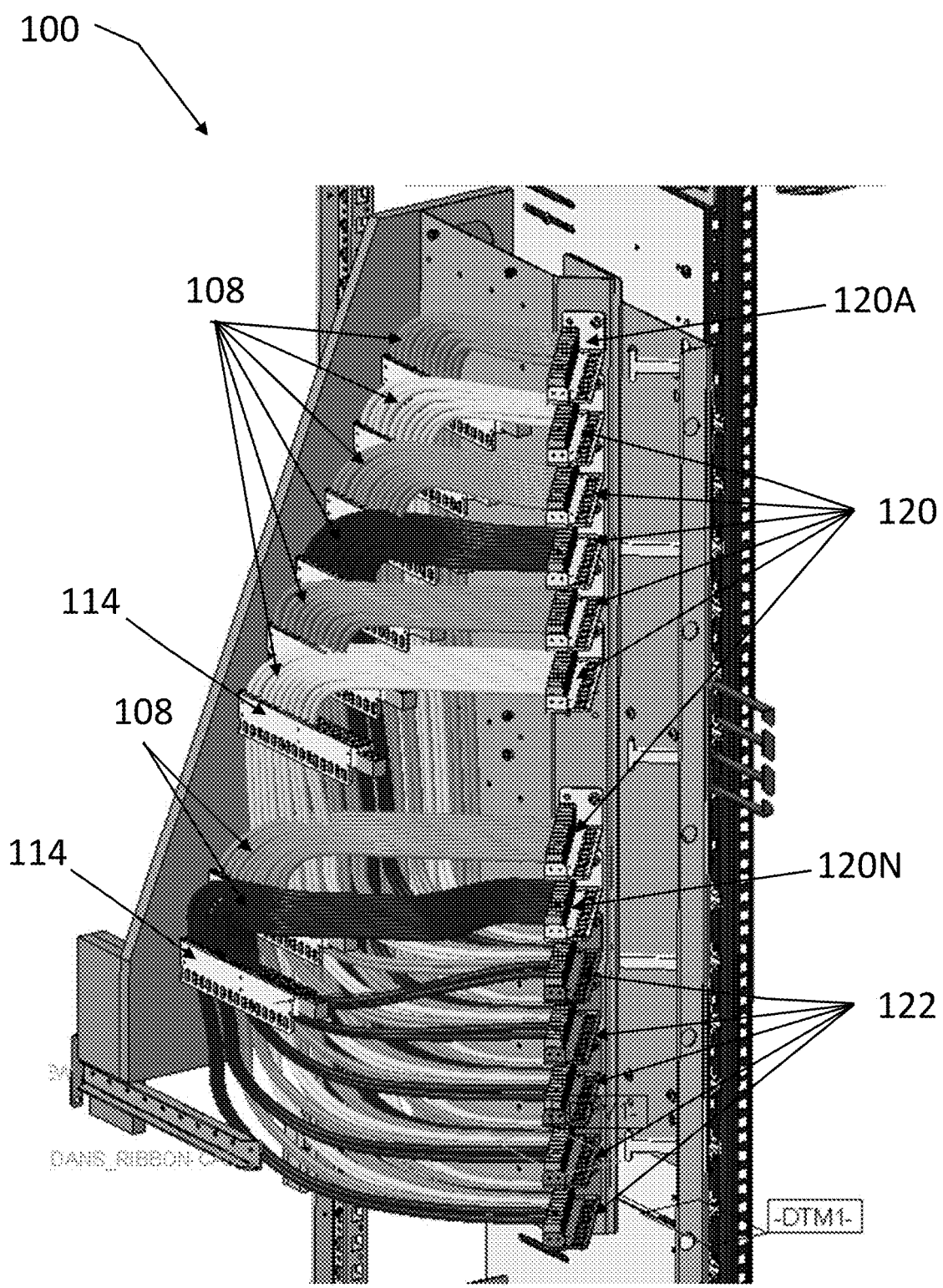
FIG. 15 is a diagram of a rack including a top-down cable topology of the present disclosure.

FIG. 15 is a diagram showing the inside of the cable housing 102 of a rack 100 including a top-down cable topology of the present disclosure. The topology shown can be utilized for the expansion cables 112 as well as the non-expansion cables 108. The figure shows the non-expansion cables 108 secured and managed by this top-down cable topology, utilizing a plurality of combs 114. It will be appreciated that various embodiments may utilize the combs 114 shown in FIG. 15, or hooks 104, or a combination of the two as well as a plurality of angled combs (120, 122). The installation process for coupling the different slots of the system (106A, 106B), utilizing the top-down cable topology begins with routing the cable for the top most slot through the first angled comb 120A, routing the cables through their corresponding comb 114, and coupling the cables to their destination slots through the angled destination comb 122. Subsequent cables (108, 112) are coupled in order from top to bottom, the last connection being the bottom most slot routed through the bottom most angled comb 120N.

It will be appreciated that the cabling topology of the present disclosure may utilize a plurality of combs 114 or hooks 104 for each cable, in order to take up slack or alleviate cable congestion.

Figure 16:
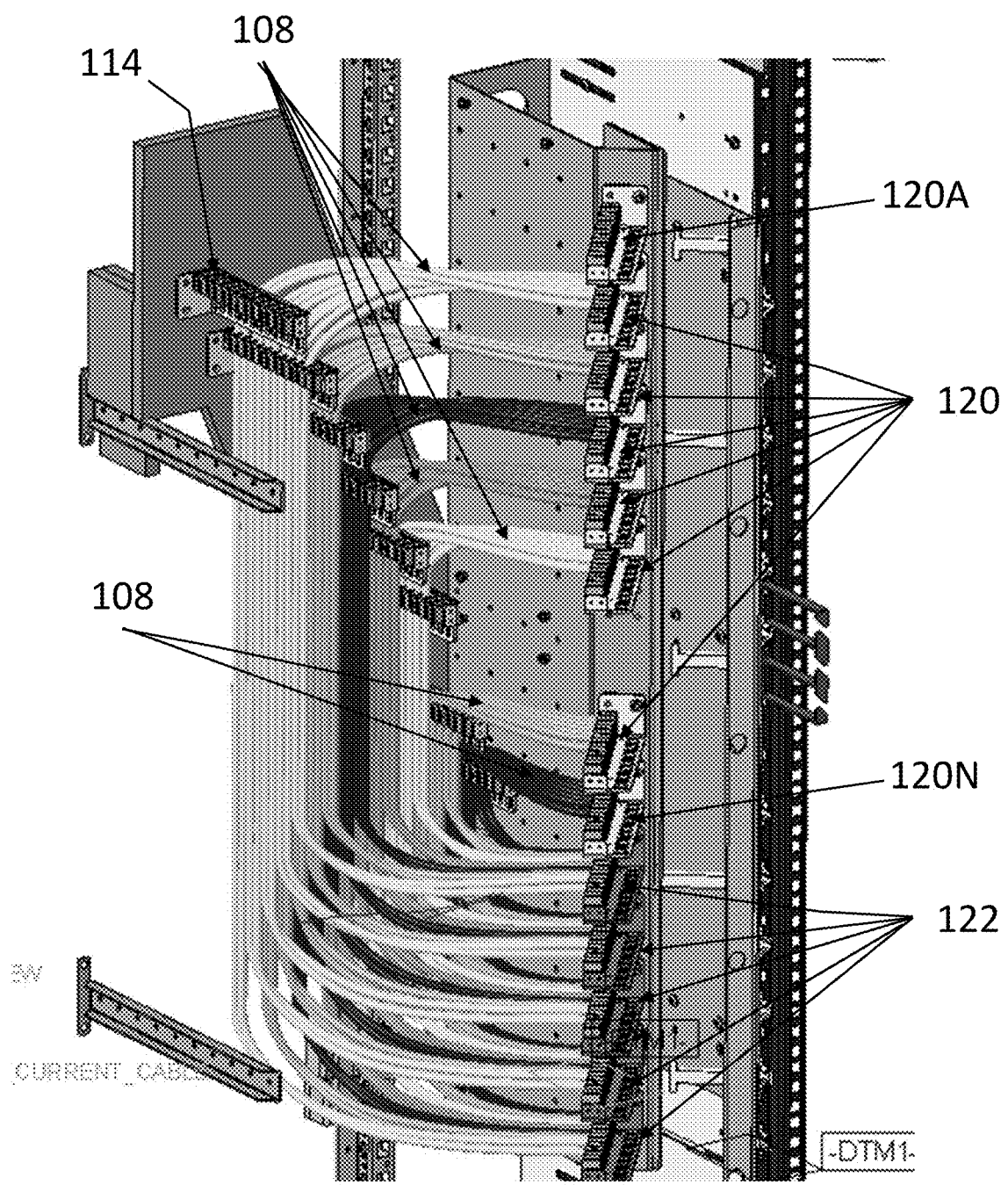
FIG. 16 is a diagram of a rack including a bottom-up cable topology of the present disclosure.

FIG. 16 is a diagram showing the inside of the cable housing 102 of a rack 100 including a bottom-up cable topology of the present disclosure. The cable topology shown in FIG. 16 can be utilized for the routing of expansion cables 112 as well as the non-expansion cables 108. The present figure shows the non-expansion cables 108 secured and managed by the bottom-up cable topology, utilizing a plurality of combs 114. Again, it will be appreciated that various embodiments may utilize the combs 114 shown in FIG. 16, or hooks 104, or a combination of the two. The installation process for coupling the different slots of the system (106A, 106B), utilizing the bottom-up cable topology begins with routing the cable for the bottom most slot through the bottom most angled comb 120N, routing the cables through their corresponding comb 114, and coupling the cables to their destination slots through the angled destination comb 122. Subsequent cables (108, 112) are coupled in order from bottom to top, the last connection being the top most slot routed through the top most angled comb 120A.

Again, it will be appreciated that the cabling topology of the present disclosure may utilize a plurality of combs 114 or hooks 104 for each cable, in order to take up slack or alleviate cable congestion.

FIG. 17A-17B are diagrams showing a ribbon style (comb 114) cable securement system of the present disclosure. FIG. 17A shows the staircase layout of the combs 114 disposed within the cable housing 102 of the rack 100. The walls of the cable housing 102 have been removed to show the cable topology in greater detail. It can be seen that the staircase layout of the combs 114 allow the cables (108, 112) to be secured and routed in a way as to allow each cable to be easily accessed after instillation. The cabling topology shown in FIG. 17A shows a top-down cable topology, but is shall be appreciated that the bottom-up cable topology described herein can also be utilized with the combs 114. The combs 114 described herein may be any commercially available cable comb or cable management device of the like.

FIG. 17B shows a closer view of the combs 114, and how the cables (108, 112) are routed and secured through the combs 114. The combs 114 allow each cable (108, 112) to be secured individually, thus allowing access to any cable in the system. The combs 114 are also adapted to take up any slack in the cables (108, 112), eliminating any cable congestion. In various embodiments, the combs 114 are secured to the structure of the cable housing 102. The present embodiment shows the combs secured to the rear inner face of the cable housing 102 via the mounting surface 124 of the combs 114 (the rear inner face of the cable housing 102 is depicted as transparent to show greater detail). Additional angled combs (120, 122) may be positioned to further organize and route the cables to their respective destinations.

Figure 18A:
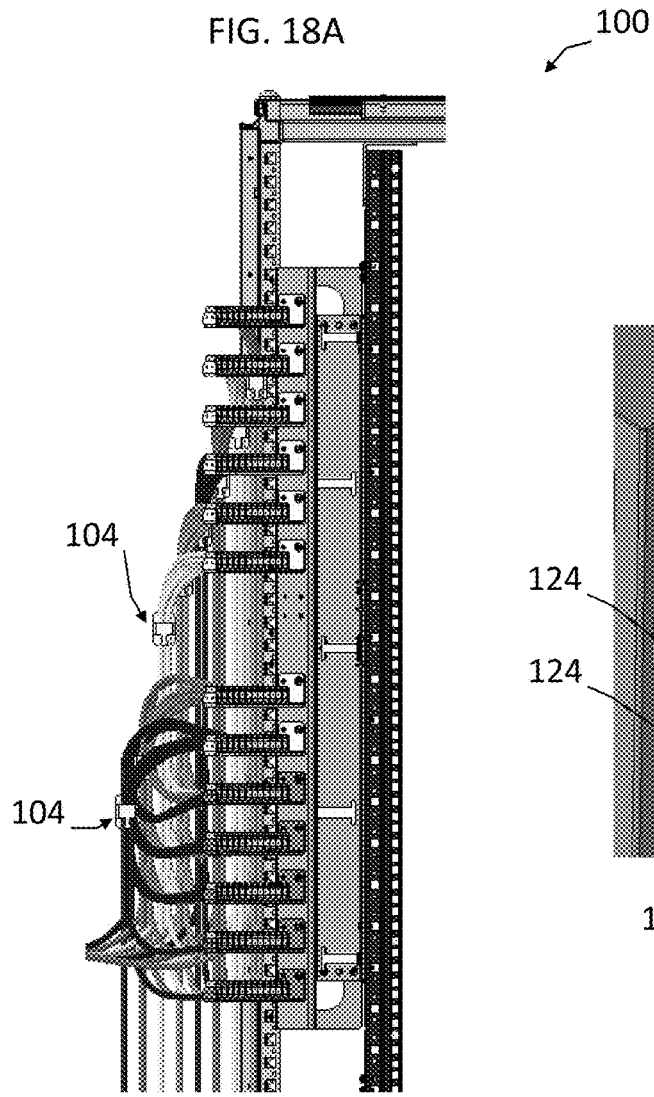
FIG. 18A-18B are diagrams showing a bulk style cable securement system of the present disclosure.
Figure 18B:
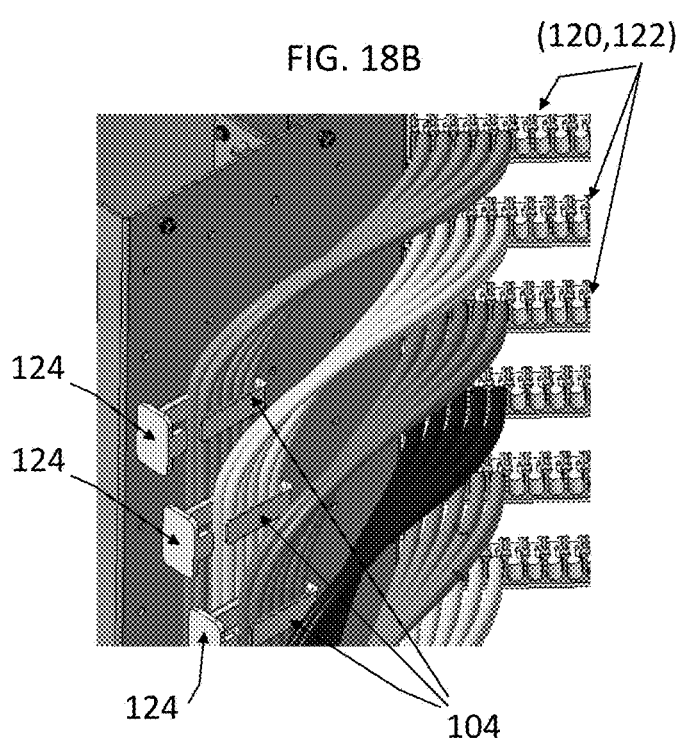

FIG. 18A-18B are diagrams showing a bulk style (hook 104) cable securement system of the present disclosure. FIG. 18A again shows the staircase layout of the cable topology, representing hooks 104 disposed within the cable housing 102 of the rack 100, the hooks 104 acting as the cable securement and routing structures. The walls of the cable housing 102 have been removed to show the cable topology in greater detail. It can be seen that the staircase layout of the hooks 104 allow the cables (108, 112) to be secured and routed in a way as to allow each cable to be easily accessed after instillation, for activities such as maintenance. The cabling topology shown in FIG. 18A shows a top-down cable topology, but is shall be appreciated that the bottom-up cable topology described herein can also be utilized with the hooks 104. The hooks 104 described herein may be any commercially available cable management device of the like.

FIG. 18B shows a closer view of the hooks 104, and how the cables (108, 112) are routed and secured through the hooks 104. The hooks 104 allow each cable (108, 112) to be installed individually, thus allowing access to any cable in the system. The hooks 104 are also adapted to take up any slack in the cables (108, 112), eliminating any cable congestion which may be present when using a single length cable. In various embodiments, the hooks 104 are secured to the structure of the cable housing 102. The present embodiment shows the hooks 104 secured to the rear inner face of the cable housing 102 via the mounting surface 124 of the hooks 104 (the rear inner face of the cable housing 102 is depicted as transparent to show greater detail).

It will be appreciated that the combs 114 shown in FIG. 17 and the hooks 104 shown in FIG. 18 may be used individually, or in combination to adapt to the needs of the rack 100, cables (108, 112), and systems (106A, 106B).

Figure 19A:
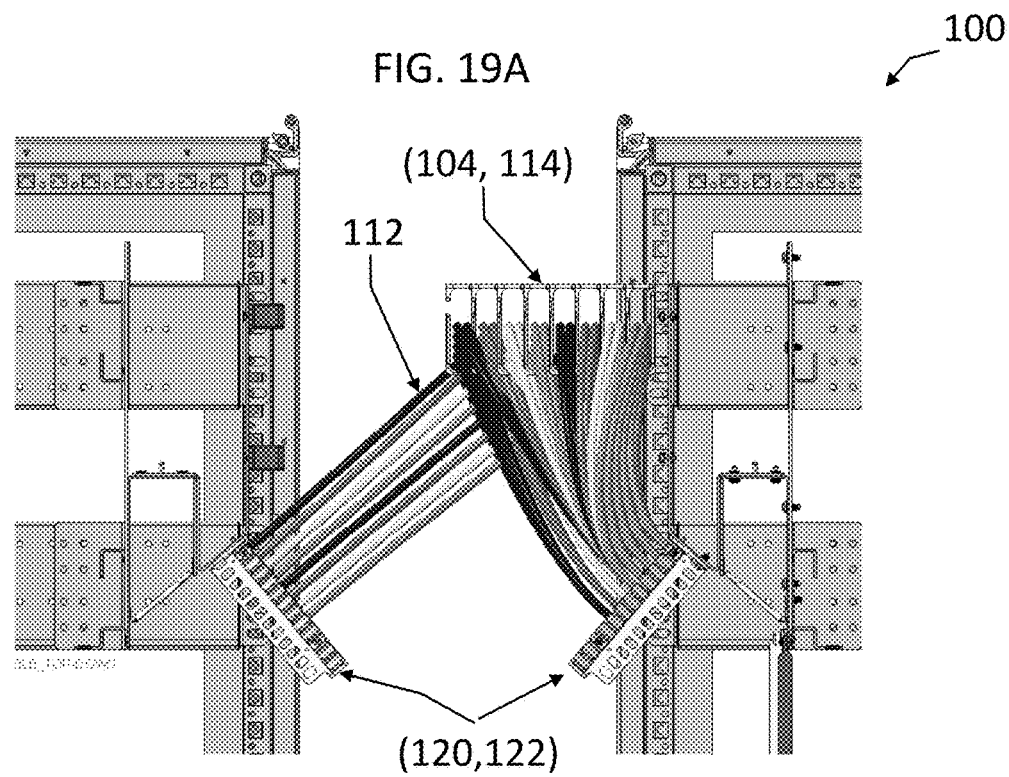
FIG. 19A-19B are diagrams showing a system expansion wherein two racks are disposed adjacent to one another.
Figure 19B:
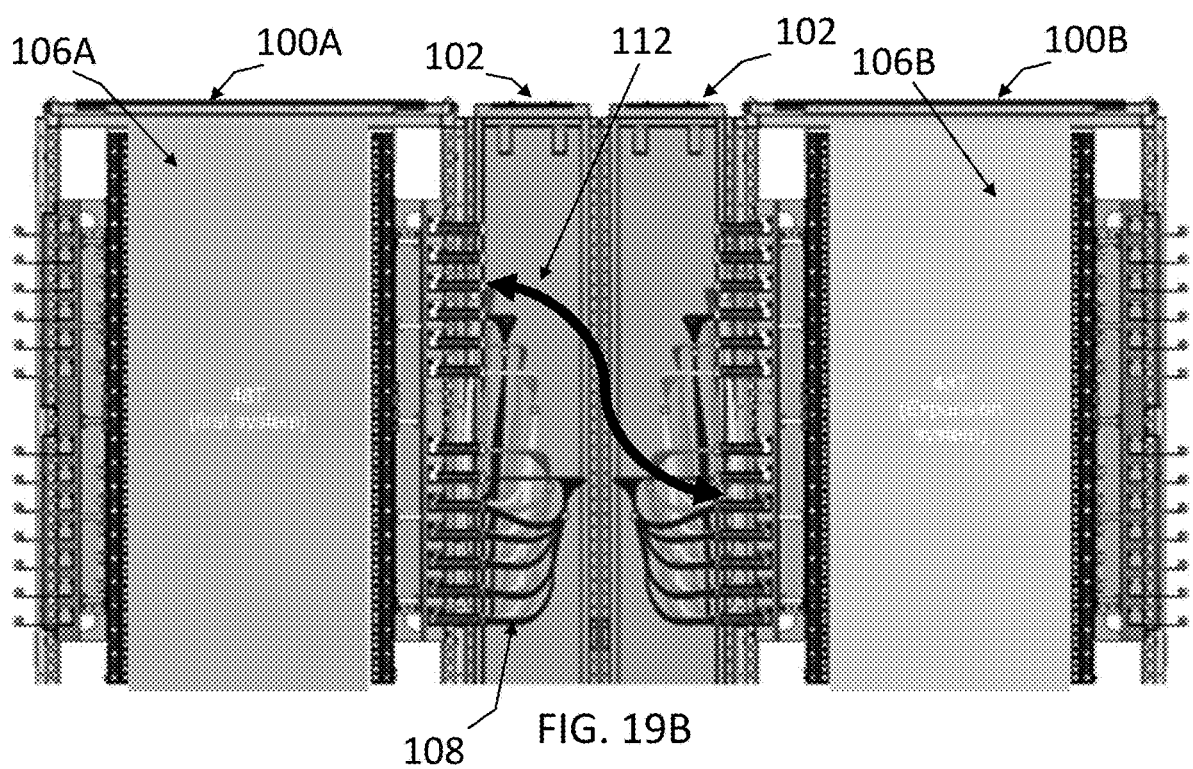

FIG. 19A-19B are diagrams showing a system expansion wherein a first and second rack 100 are disposed adjacent to one another, each containing one or more of a first system 106A and/or an expansion system 106B. FIG. 19A is a top down view of two racks 100 disposed adjacent to one another, the first rack 100A containing a first system 106A and the second rack 100B containing an expansion system 106B. the two systems (106A, 106B) are coupled via a plurality of expansion cables 112, the expansion cables 112 being routed from the first system 106A to the expansion system 106B. The expansion cables 112 are routed and secured by hangers 104 and/or combs 114 to take up any slack in the expansion cables 112.

In various embodiments, all of the expansion cables 112 and the non-expansion cables 108 are the same length. The various hooks 104 and combs 114 take up any slack which may result from this one length cable topology. FIG. 19B shows a front view of the two racks (100A, 100B) containing the non-expansion cables 108 and expansion cables 112. The expansion cables 112 are routed from the first system 106A to the expansion system 106B, and the non-expansion cables 108 are routed locally to the respective system. It will be appreciated that the cabling topology of the present disclosure may include any number of cables (108, 112), hooks 104, combs (114, 120, 122), and systems (106A, 106B).

Cable Installation Process

Figure 20:
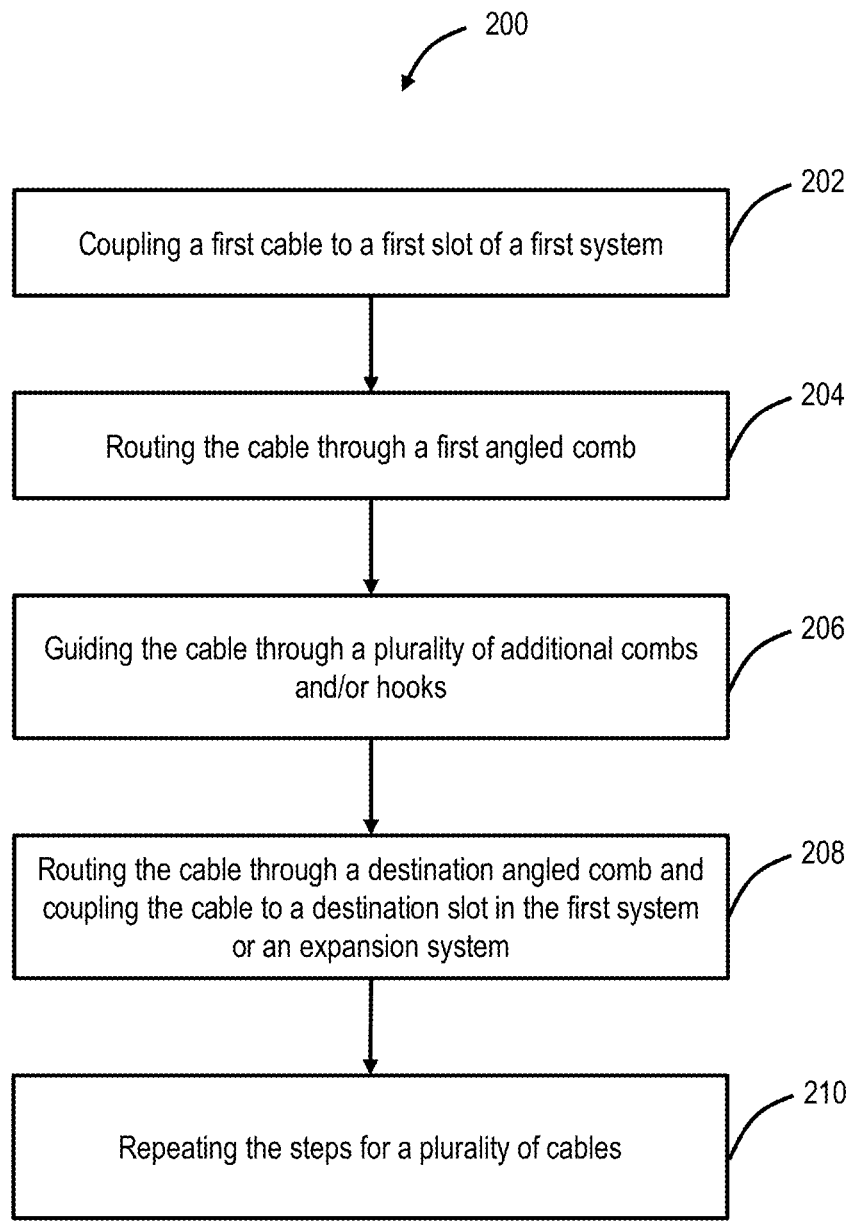
FIG. 20 is a flow diagram of a process for installing cables with the cabling topology of the present disclosure.

FIG. 20 is a flow diagram of the process 200 for installing cables with the cable topology of the present disclosure. A first cable is coupled to a first slot of a first system 202. The cable is routed through a first angled comb 204. The cable is then routed through a plurality of additional combs and/or hooks to take up slack in the cable 206. The cable is then routed through the destination angled comb and coupled to the destination slot in the same system or an expansion system 208. This process is repeated for the remainder of the cables 210.

For a top-down instillation style cable topology, the first slot and first angled comb are the top most slot and top most angled comb, and the process is repeated with the proceeding cables being installed working downward. For a bottom-up instillation style cable topology, the first slot and first angled comb are the bottom most slot and bottom most angled comb, and the process is repeated with the proceeding cables being installed working upward. The cables described in process 200 may be non-expansion cables coupling slots of a single system and/or expansion cables coupling slots of a plurality of systems, the plurality systems either disposed in the same rack or different racks.

Guided Cable Assist

Various network elements utilize a cabled fabric instead of a backplane. When cabling a system, there is an ideal order that optimizes the cabling for ease of installation, future expansion, replacement of cables, and maximizing the use of Direct Attach Cable (DAC) cables over more expensive Active Optical Cable (AOC) cables. The present disclosure provides a guided mode that blinks port LEDs on the faceplate cage as an indication that assists the user in cabling a system optimally from start to finish. For fabric connections, the present systems and methods enforce a CLOS topology regardless of cabling order.

The network element Control & Timing Module (CTM) sends messages over a control backplane to the Interface box (Ibox) and Fabric Box (Fbox) in order to control the fabric port LEDs on each of the modules. Ibox and Fbox are further referred to as modules. Since the serial number of plugs at both ends of a cable can be identical, software can utilize this to verify that both ends of the cable are plugged into the correct ports. It will be appreciated that in other embodiments, the serial numbers of the plugs need not be the same, and verification can be completed with cables having different plugs at both ends (i.e., having different serial numbers).

Figure 21:
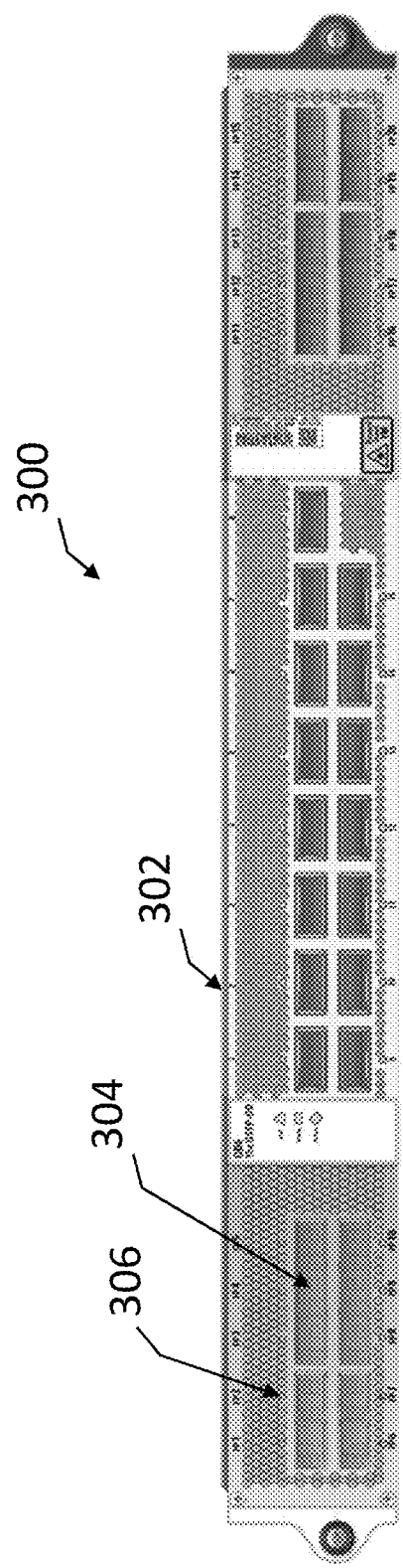
FIG. 21 is a diagram of an example module faceplate.

FIG. 21 is a diagram of an example module 300 including a faceplate 302. A plurality of ports 304 and their LEDs 306 are located on the faceplate 302 relative to the plurality of ports 304, the relative location of the LEDs representing a specific port. In the example depicted in FIG. 21, the ports 304 and their LEDs 306 are located on the left and right portions of the faceplate 302. It will be appreciated that the locations of the ports 304 and LEDs 306 can be any location on the faceplate 302 or any location on a module 300. The module 300 can be one of a plurality of modules in a system disposed in a network element.

In various embodiments, the LEDs 306 can operate based on a plurality of steady state policies, for example, the LEDs 306 can illuminate in different colors to indicate a plurality of situations such as:
Red:
    Cable module fail
Green:
    Correct cable type seated at both ends with correct topology
    Has passed insertion integrity test either in-use or waiting to be fully enabled by fabric manager
Off:
    no plug inserted or equipment un-provisioned (fabric port host or fabric XCVR) or equipment mismatch (cable plug does not match provisioning)
Yellow:
    all other cases—three case are discussed: the cable has incorrect topology, the cable has 1 or more disabled lanes due to poor signal integrity, the cable has one or more lanes LOS In various embodiments, the LEDs 306 can operate based on a plurality of assist mode policies. Assist mode is a temporary LED policy that applies to a single fabric port LED 306 when a fabric cable is inserted. This may apply to a far end fabric port LED is case of a misconnected cable and may apply to the topologically correct module fabric port in case of an open cable. At the detection of a module fabric port cable insertion, the fabric manager will check for a misconnection, if one is detected, the assist mode policy is invoked. In various embodiments, assist mode can be cancelled by the following events: Assist mode timeout (for example, 30 s-1 min), Cable failure detection, Detection of correct connection on the fabric cable connected to a module fabric port in question, Detection of removal of the fabric cable connected to the module fabric port in question, Detection of cable insertion on a different module fabric port in the system, and other events of the like.

Additionally, various embodiments include policy if a module cable is inserted into a module fabric port and deemed to have correct topology, then assist mode is not entered and standard LED policy applies where port LED goes solid green or yellow if the integrity test fails. If a module cable is inserted into a module fabric port and is open at the far end, then assist mode is entered and the port LED flashes yellow (maximum duration: assist mode timeout), If the far end port that should be connected flashes yellow also. If a module cable is inserted into a module fabric port, and is misconnected at the far end, then assist mode is entered and the port LED flashes red (maximum duration: assist mode timeout), the far end misconnected port will flashes red also.

The present disclosure claims a similar assist mode for non-fabric or non-CLOS connectivity. For example, when the network element CTMs in multiple housings are connected in a dual-ring topology. Additionally, the present disclosure claims the following Quad Small Form Factor Pluggable-Double Density (QSFP-DD) cables: DAC, Amplifier Copper Cable (ACC), Active Electrical retimer copper Cable (AEC), and AOC. However, the present disclosure is not restricted to only these types of cables or plugs.

The embodiments disclosed herein allow the re-use of QSFP-DD cage LEDs to guide an installer to plug cables in the right topology and the right order, use of cable serial numbers to verify and move on to the next cable to be installed, and transition of LEDs from cable assist mode to operational port mode. Various embodiments use orthogonal LED states so that mission mode LED states are not confused with cable assist LED states. Orthogonal LED states can, for example, use a different color (refer to FIG. 25). Cable assist mode can further be initiated during a cable replacement in a working system, thus, not being limited to initial install. It will be appreciated that in various embodiments, the LEDs utilized by the present cable assist mode and mission mode can be the same LEDs, different LEDs, and a combination thereof.

Figure 22D:
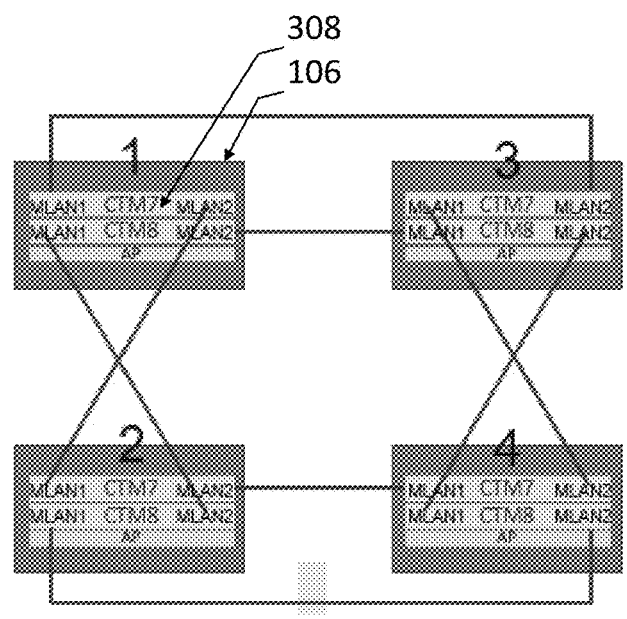
Figure 22E:
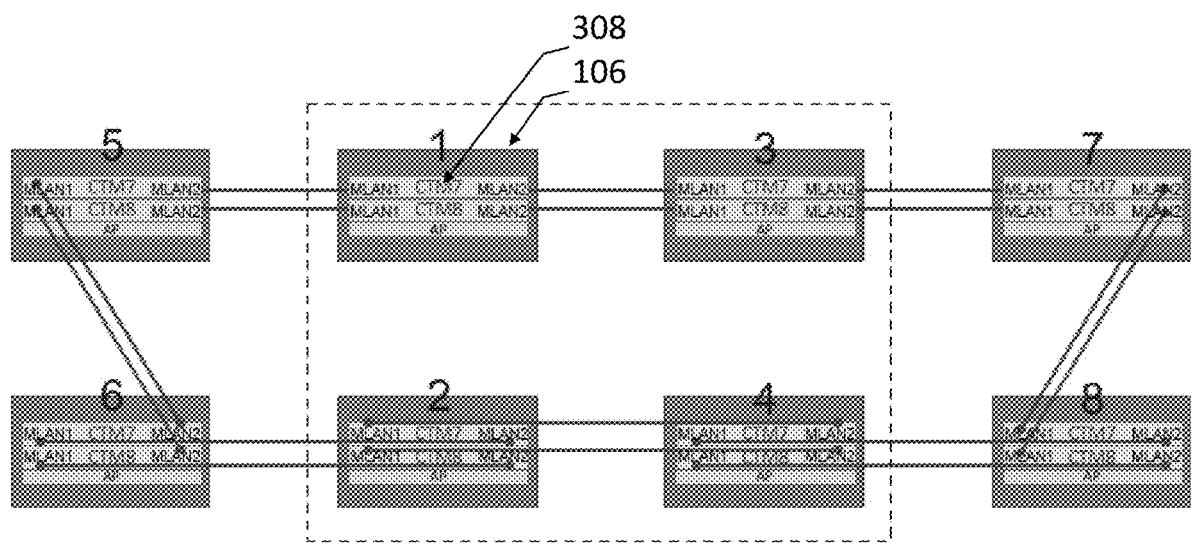

FIG. 22A-FIG. 22E show a plurality of templates for Control & Timing Module (CTM) 308 connection topologies across a plurality of network elements 100. FIG. 22A shows an example connection topology for connecting a plurality of CTMs 308 in a single network element 100. The example shows a plurality of systems 106 in a single network element 100, see FIG. 3 for example. FIG. 22B shows an example connection topology for connecting a plurality of CTMs 308 in different network elements 100. The example shows a plurality of systems 106 in different network elements 100, see FIG. 4 for example. FIG. 22C shows a connection topology for connecting a network element with multiple systems 106 to a network element with a single system 106. This is also a combination of the system connections shown in FIG. 22A and FIG. 22B. Further, FIG. 22D shows a connection topology for connecting two network elements 100, where each network element 100 includes a plurality of systems 106. This is expanded further in FIG. 22E. It will be appreciated that the CTMs 308 can be any module known to one of ordinary skill, and any number of systems 106, network elements 100, and modules (CTMs), are contemplated in any combination in other embodiments. In various embodiments, specific CTM slots only connect to other specific CTM slots in other network elements or systems, and data cables only connect to specific locations to form a ring topology. It will be appreciated that FIG. 22A-FIG. 22E only show physical arrangements, not logical arrangements.

Figure 23:
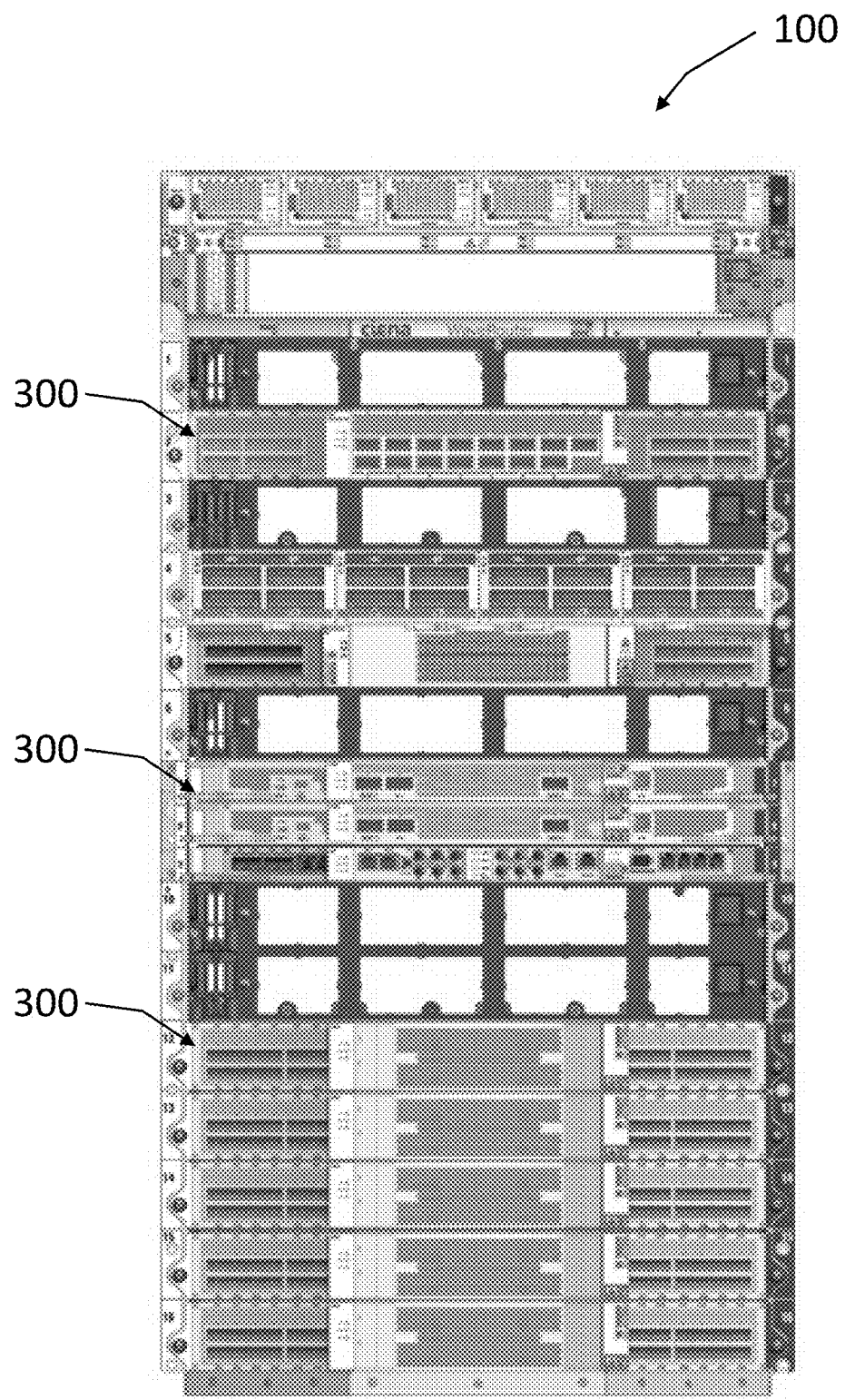
FIG. 23 shows an exemplary network element with a plurality of modules.

FIG. 23 shows an exemplary network element 100 with a plurality of modules 300. The present systems and methods provide a guide that assists a user in cabling a system 106, network element 100, module 300, etc. optimally from start to finish. The modules 300 shown in FIG. 23 can be any of a power box, access panel, fabric box, Qbox, subslot module, CTM, and the like. Further, guided cable assist of the present disclosure can guide the connection of any type of module to any other type of module in the same network element or any number of different network elements. The guided cable assist of the present disclosure guides a user to the correct port 304 on a module 300.

Figure 24A:
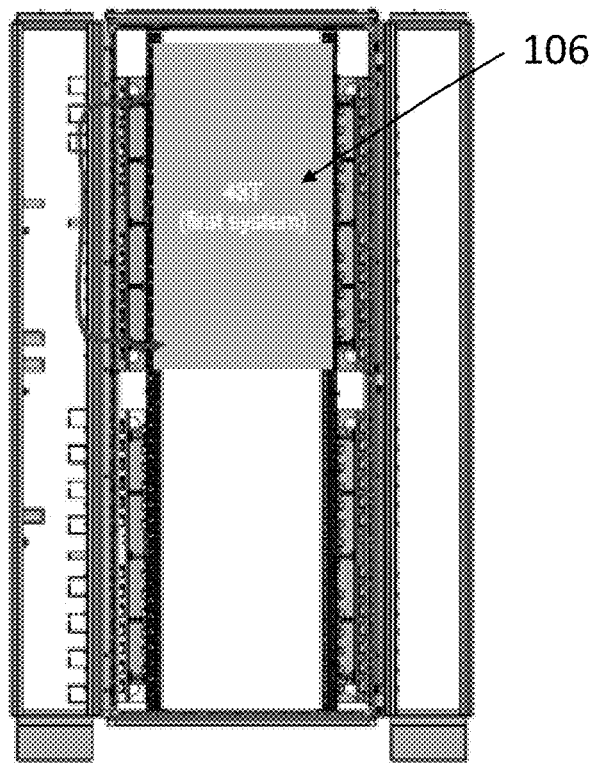
FIG. 24A-FIG. 24I show steps of an example cabling setup.
Figure 24B:
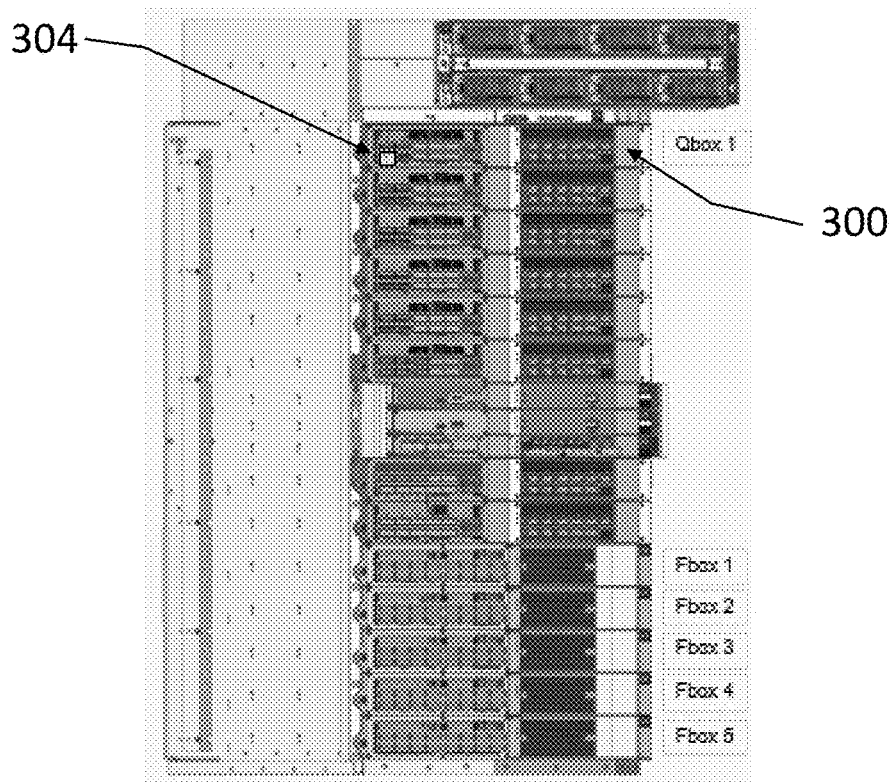
Figure 24C:
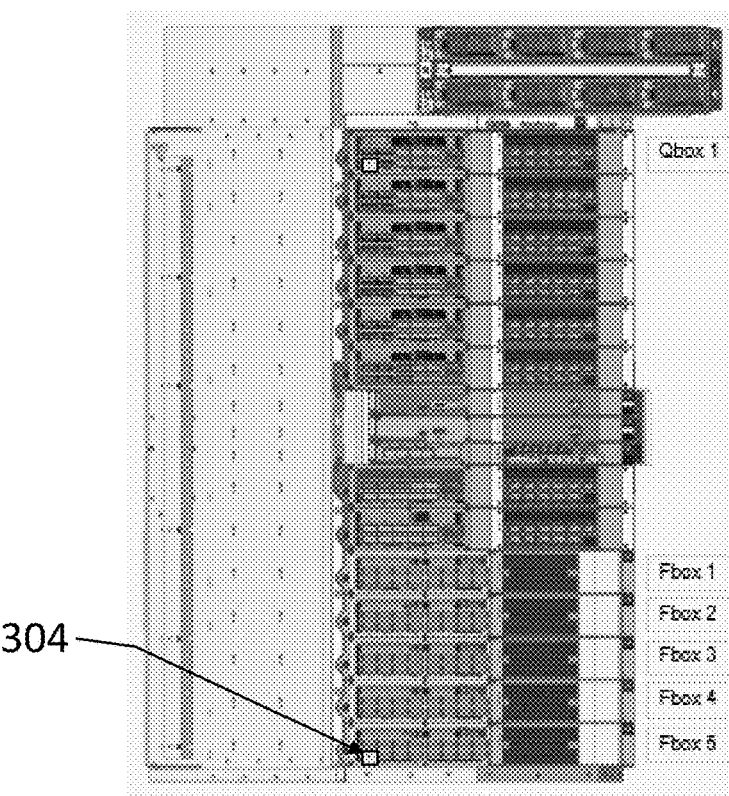
Figure 24D:
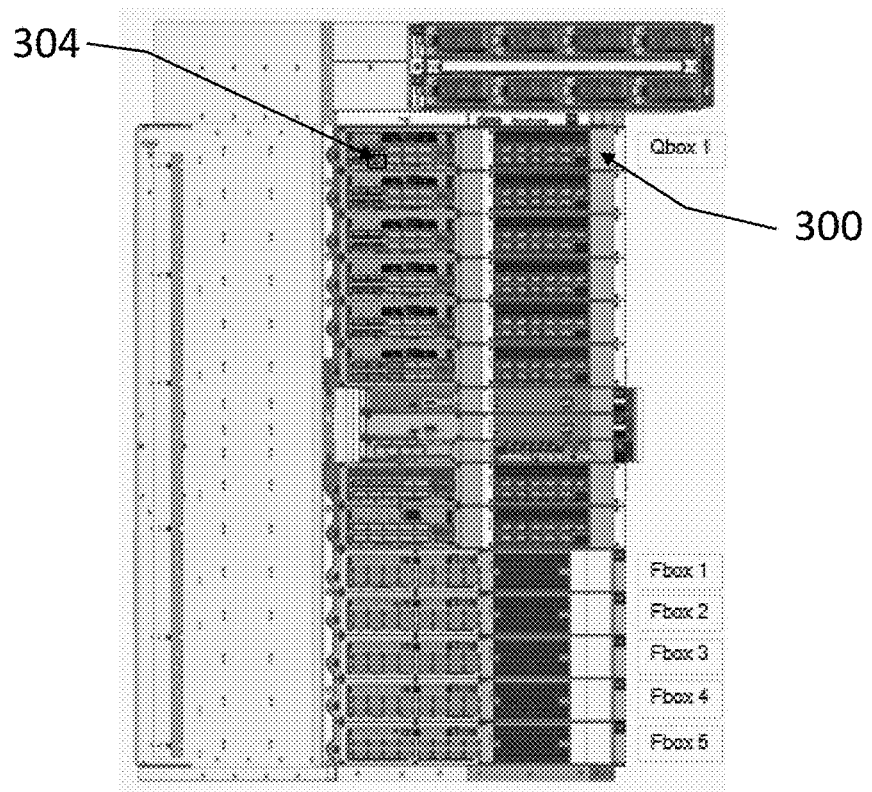
Figure 24E:
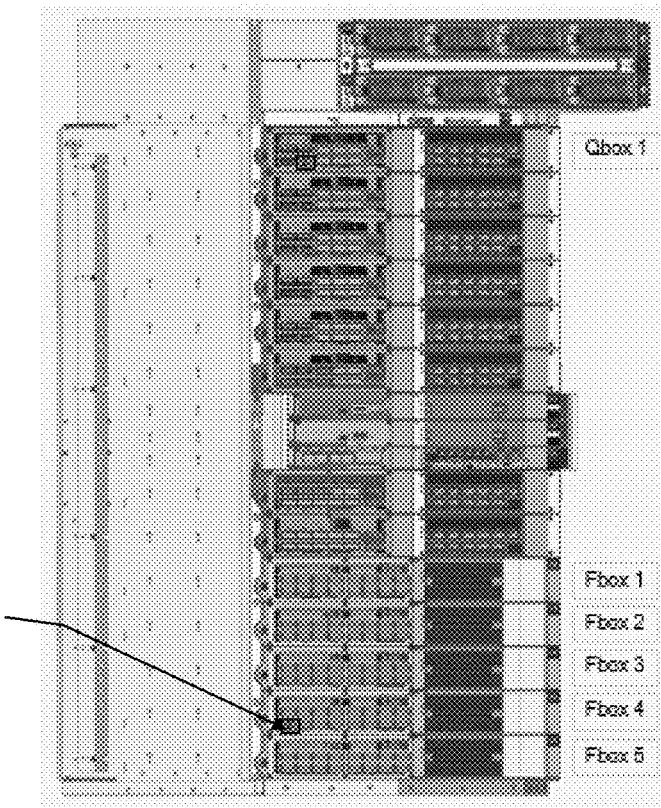
Figure 24F:
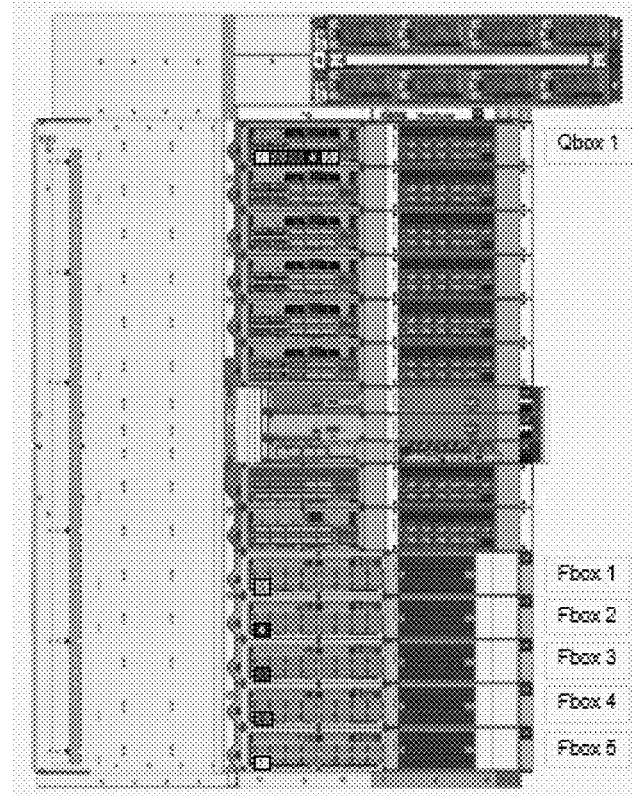
Figure 24G:
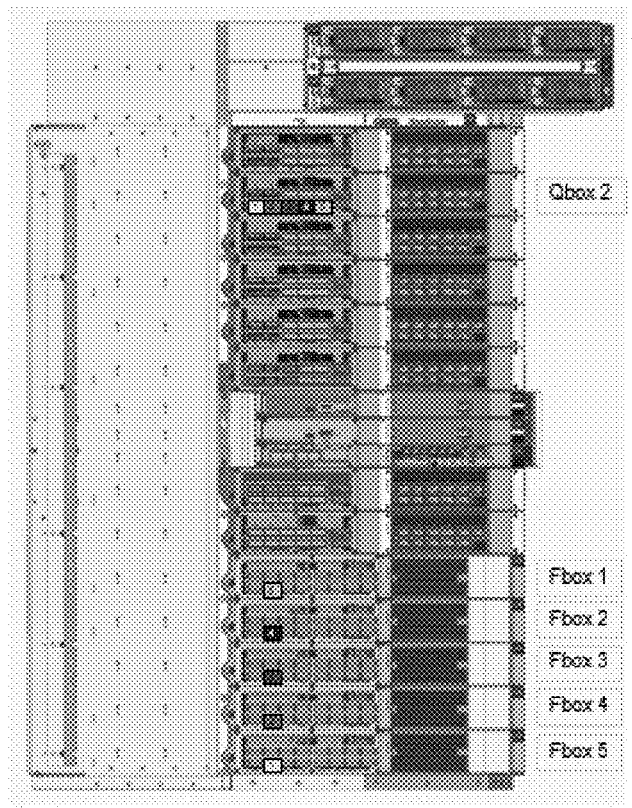
Figure 24H:
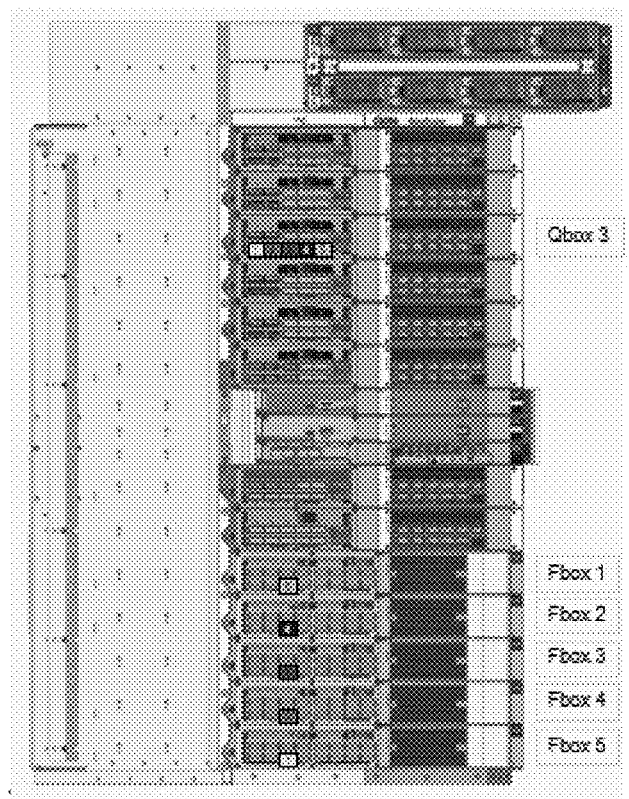
Figure 24I:
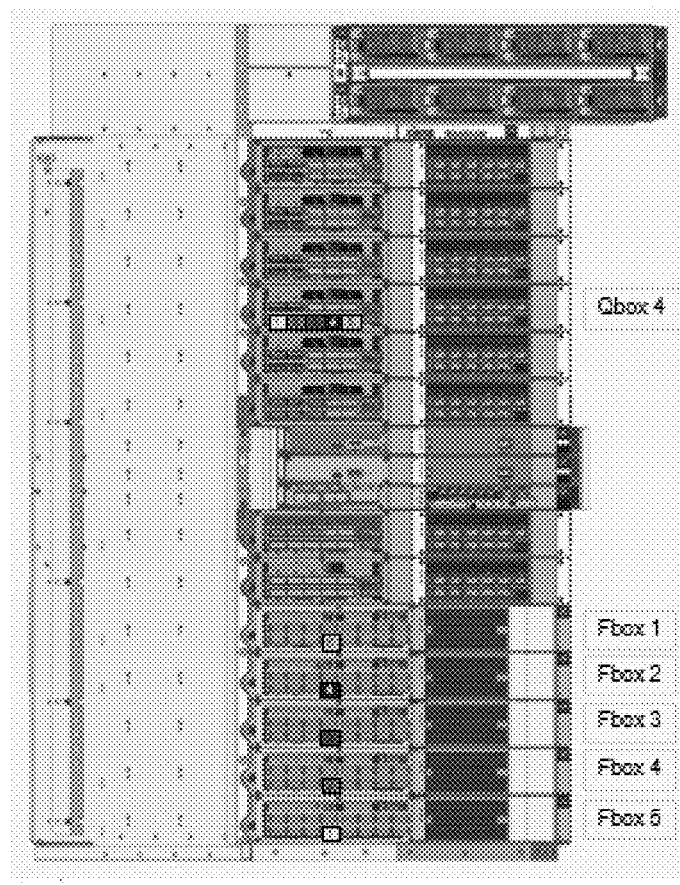

FIG. 24A-FIG. 24I show steps of an example cabling setup. FIG. 24A shows a first step including commissioning the system 106 to be setup. Commissioning the system 106 includes determining the size of the system 106 (i.e., how many modules 300 there are in the system 106). FIG. 24B shows a second step including installing a first end of a first cable into a first port 304 in the module 300. This initiates the cable assist mode for this port causing the LED 306 at the first port 304 to blink yellow. FIG. 24C shows a third step of the cabling setup process. The LED 306 at the port 304 meant to receive a second end of the first cable also blinks yellow to indicate the connection is to be made to that port. A user then plugs the second end of the cable into the indicated port 304. The system automatically performs an integrity test and topology check for this cable. For topology checks, software correlates plug serial numbers and utilizes the fact that a cable has the same serial number at both ends to verify the topology. It will be appreciated that in other embodiments, the serial numbers of the plugs need not be the same, and verification can be completed with cables having different plugs at both ends (i.e., having different serial numbers). The LEDs at both ends of the first cable now illuminate solid green to indicate a proper connection. FIG. 24D shows a fourth step including installing a first end of a second cable into the port 304 in the module 300. The user may choose this port based on recommendations in documentation about cable installation order. This initiates the cable assist mode for this port causing the LED 306 at the port 304 to blink yellow. Note, the cable assist mode for the first cable ends after a predetermined amount of time, so the LEDs assisting for the first cable may be off. FIG. 24E shows a fifth step including the LED 306 at the port 304 meant to receive a second end of the second cable also blinks yellow to indicate the connection is to be made to that port. The user then plugs the second end of the second cable into the indicated port 304. The system then automatically performs an integrity test and topology check for the second cable. The LEDs at both ends of the second cable now illuminate solid green to indicate a proper connection. FIG. 24F-FIG. 24I show the steps being repeated for the remainder of the ports 304 on the modules 300. After a timeout, cable assist mode for the last cable exits and the LED mode for all ports is now in mission mode (see FIG. 25).

Figure 25:
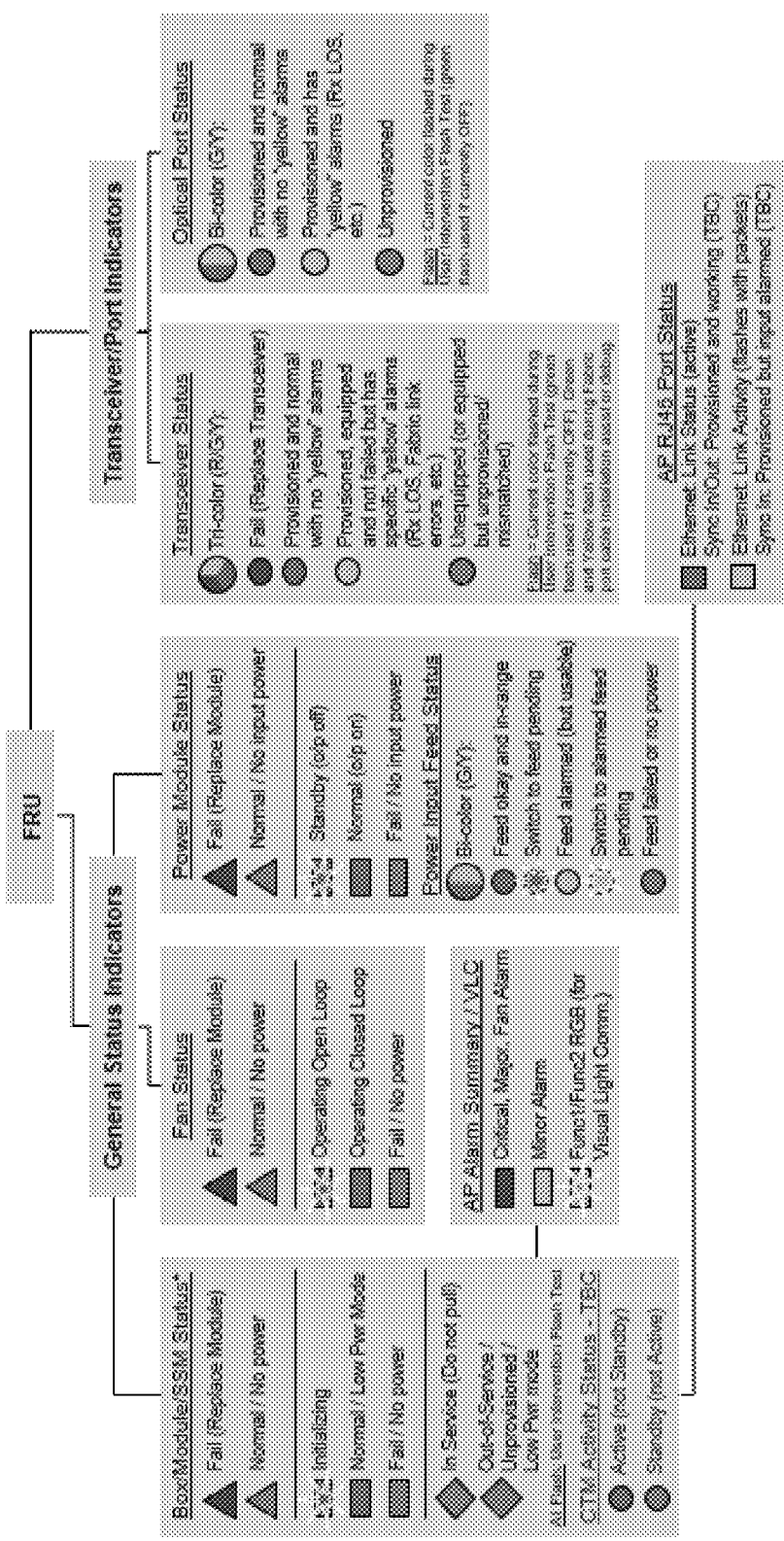
FIG. 25 shows LED status indications for LEDs in mission mode.

FIG. 25 shows LED status indications for LEDs in mission mode. The indications can be broken down into two sections including general status indicators and transceiver/port indicators. It will be appreciated that the box/module/SSM status indicators apply to any module except during a lamp test.

Figure 26:
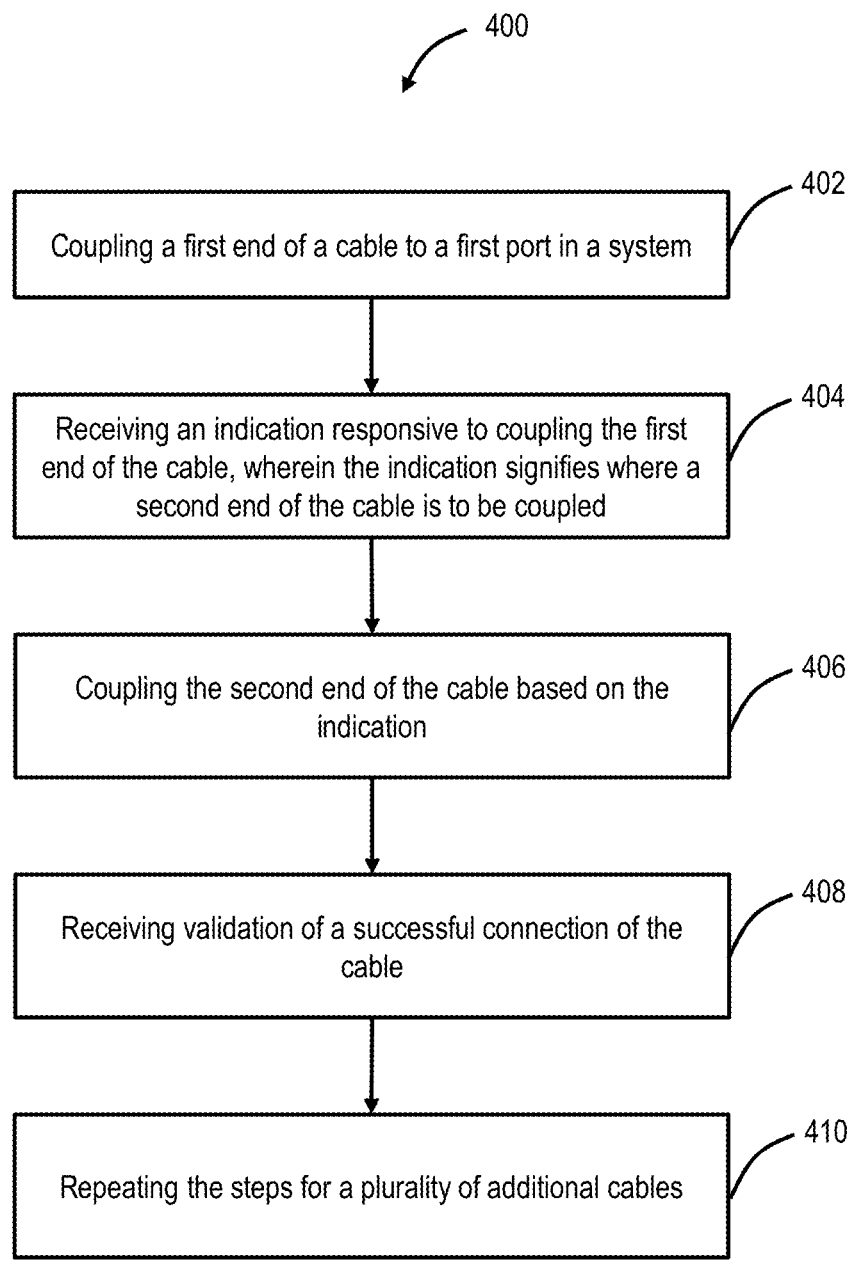
FIG. 26 is a flow diagram of the process for installing cables with the guided cable assist of the present disclosure.

FIG. 26 is a flow diagram of the process 400 for installing cables in a network element with the guided cable assist of the present disclosure. The present disclosure provides a cable assist mode that blinks port LEDs on the faceplate cage that assists the user in cabling a system optimally from start to finish. The process can be invoked by a user coupling a first end of a cable to a first port in a system (step 402). The user then receives an indication responsive to coupling the first end of the cable, wherein the indication signifies where a second end of the cable is to be coupled (step 404). The user then couples the second end of the cable based on the indication (step 406). The second end of the cable can be coupled to a port on the same system or a different system. The present systems and methods then perform validation checks to verify the connection is successful and the user receives the validation (step 408). The steps are then repeated for any additional cables (410).

Figure 27:
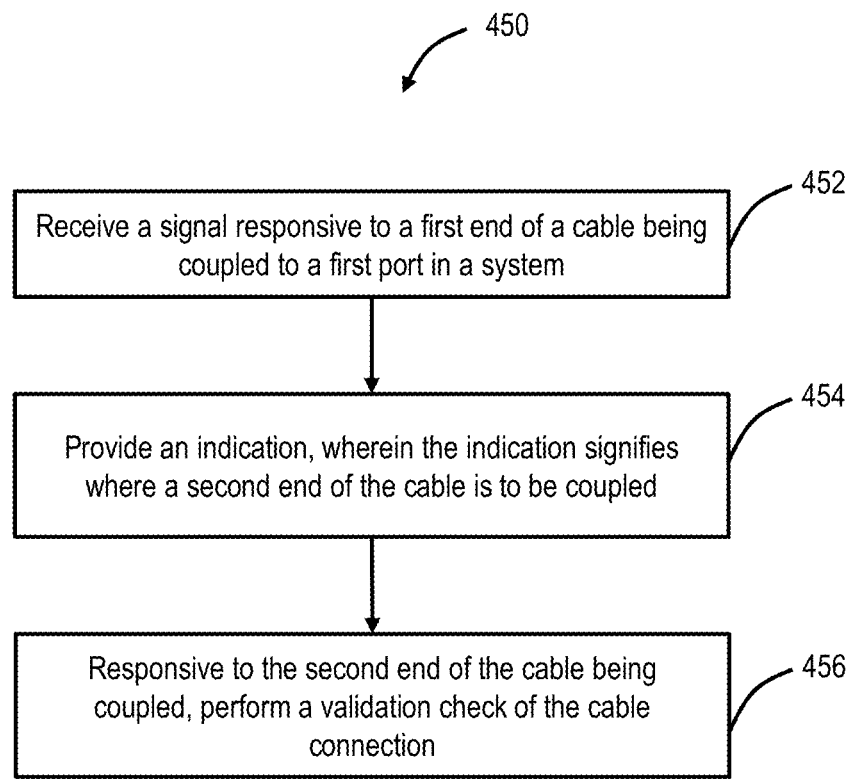
FIG. 27 is a flow diagram of a process for assisting cable installation in a network element with the guided cable assist of the present disclosure.

FIG. 27 is a flow diagram of a process 450 for assisting cable installation in a network element with the guided cable assist of the present disclosure. The process 450 can be implemented by a non-transitory computer-readable medium comprising instructions that, when executed, cause a processor to receive a signal responsive to a first end of a cable being coupled to a first port in a system (step 452). Providing an indication, wherein the indication signifies where a second end of the cable is to be coupled (step 454). Responsive to the second end of the cable being coupled, performing a validation check of the cable connection (step 456).

In various embodiments, the system is invoked by a user coupling a first end of a first cable to a port in a system. In other embodiments, the system (i.e., cable assist mode of the present disclosure) can be invoked by a User Interface (UI), or other methods of the like. The system can be one of a plurality of systems, and the first and second end of the cable can be coupled to the same, or different systems as described herein. Additionally, the systems can be disposed in the same, or different network elements as shown in the figures. Further, the systems disclosed herein can include one or more modules.

In various embodiments, the indication provided to a user by the system (i.e., the directions of where to couple the ends of the cable) is communicated to a user by illuminating one or more LEDs on modules of one or more systems. Again, the one or more systems can be disposed in the same, or different network elements. In other embodiments, the indication can be in the form of Augmented Reality (AR) wherein a user utilizes AR equipment to visualize where the connections are to be made. The AR equipment can be any equipment for visualization such as Virtual Reality (VR) goggles, mobile devices, and other equipment known to one of skill in the art for AR visualization.

The validation includes the system automatically performing an integrity test and topology check for this cable. For topology checks, software correlates plug serial numbers and utilizes the fact that a cable has the same serial number at both ends to verify the topology. It will be appreciated that in other embodiments, the serial numbers of the plugs need not be the same, and verification can be completed with cables having different plugs at both ends (i.e., having different serial numbers). The system validates that the connection is not incorrect or incomplete (i.e., misconfigured, or open at an end). A successful connection means the connection is correct. In various embodiments, responsive to a misconfigured connection, one of the modes (cable assist mode, or mission mode) described herein can be invoked. This can, for example, make the LEDs at the ends of a misconfigured connection flash red.

The present system not only assists in cable placement and replacement, but can be used to guide an installer through an engineered cabling sequence to optimize cable length and optimize ease of physical cable install. Other embodiments utilize the system for cable installation/commissioning, maintenance/replacement, module addition/removal, hitless complex capacity migration, and other operations of the like. Hitless complex capacity migration being a method to expand the capacity of a complex by adding fabric devices (modules) without affecting pre-existing traffic which is facilitated by the cable assist function.

Also, when used herein, the terms optimal, optimize, etc. are used to indicate some improvement and not necessarily an exact optimum value.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause a processor to:
receive a signal responsive to a first end of a cable being coupled to a first port of a first module in a system;
provide an indication on the first module that signifies that the first end of the cable is coupled to the first port:
provide an indication on a second module that signifies a second port of the second module where a second end of the cable is to be coupled; and
responsive to the second end of the cable being coupled, perform a validation check of the cable connection;
wherein the indication on the first module and the indication on the second module indicate cable insertion integrity for the first port and the second port or disabled lanes including channels with insufficient signal integrity for the cable between the first port and the second port via indication illumination;

wherein the indication on the first module and the indication on the second module are controlled via messages sent between a plurality of control and timing modules of one or more network elements over a control plane to which the first module and the second module and the plurality of control and timing modules are coupled; and wherein the indication on the first module and the indication on the second module are in the form of Augmented Reality (AR).

2. The non-transitory computer-readable medium of claim 1, wherein responsive to the coupling of the second end of the cable, the instructions further cause the processor to provide validation of a successful connection of the cable.

3. The non-transitory computer-readable medium of claim 1, wherein the instructions further cause the processor to repeat the receive, provide, and perform for a plurality of cables adapted to couple modules of one or more systems.

4. The non-transitory computer-readable medium of claim 1, wherein the indication on the first module and the indication on the second module include illuminating Light Emitting Diodes (LEDs) disposed relative to one or more ports.

5. The non-transitory computer-readable medium of claim 4, wherein the LEDs are visibly different when used for the validation check versus during normal operation for status.

6. The non-transitory computer-readable medium of claim 1, wherein the indication on the first module and the indication on the second module is invoked by one of the coupling of the first end of the cable and by a User Interface (UI), triggering an assist mode that is active until a predetermined timeout period expires or a cancellation event occurs.

7. The non-transitory computer-readable medium of claim 1, wherein the system is one of a plurality of systems disposed in the one or more network elements, and the first and second end of the cable are coupled to different systems.

8. The non-transitory computer-readable medium of claim 7, wherein the indication on the first module and the indication on the second module include illuminating Light Emitting Diodes (LEDs) associated with one or more pluggable optical module cages.

9. The non-transitory computer-readable medium of claim 1, wherein the indication is adapted to guide an installer through a cabling sequence to ensure proper cable length and assist in physical cable install, and further to denote correctness of topology.

10. A method comprising steps of:
coupling a first end of a cable to a first port of a first module in a system;
receiving an indication on the first module responsive to coupling the first end of the cable, wherein the indication on the first module signifies that the first end of the cable is coupled to the first port;
receiving an indication on a second module responsive to coupling the first end of the cable, wherein the indication on the second module signifies a second port of the second module where a second end of the cable is to be coupled; and
coupling the second end of the cable based on the indication on the second module;
wherein the indication on the first module and the indication on the second module indicate cable insertion integrity for the first port and the second port or disabled lanes including channels with insufficient signal integrity for the cable between the first port and the second port via indication illumination;

wherein the indication on the first module and the indication on the second module are controlled via messages sent between a plurality of control and timing modules of one or more network elements over a control plane to which the first module and the second module and the plurality of control and timing modules are coupled; and wherein the indication on the first module and the indication on the second module are in the form of Augmented Reality (AR).

11. The method of claim 10, wherein responsive to the coupling of the second end of the cable, the steps further comprise receiving validation of a successful connection of the cable.

12. The method of claim 10, wherein the steps are repeated for a plurality of cables adapted to couple modules of one or more systems.

13. The method of claim 10, wherein the indication on the first module and the indication on the second module signifies where the second end of the cable is to be coupled by way of Light Emitting Diodes (LEDs) disposed relative to one or more ports.

14. An apparatus comprising:
a processor, and
memory storing instructions that, when executed, cause the processor to
receive a signal responsive to a first end of a cable being coupled to a first port of a first module in a system;
provide an indication on the first module that signifies that the first end of the cable is coupled to the first port;
provide an indication on a second module that signifies a second port of the second module where a second end of the cable is to be coupled; and
responsive to the second end of the cable being coupled, perform a validation check of the cable connection;
wherein the indication on the first module and the indication on the second module indicate cable insertion integrity for the first port and the second port or disabled lanes including channels with insufficient signal integrity for the cable between the first port and the second port via indication illumination;
wherein the indication on the first module and the indication on the second module are controlled via messages sent between a plurality of control and timing modules of one or more network elements over a control plane to which the first module and the second module and the plurality of control and timing modules are coupled; and
wherein the indication on the first module and the indication on the second module are in the form of Augmented Reality (AR).

15. The apparatus of claim 14, wherein responsive to the coupling of the second end of the cable, the instructions further cause the processor to provide validation of a successful connection of the cable.

16. The apparatus of claim 14, wherein the steps are repeated for a plurality of cables adapted to couple modules of one or more systems.

17. The apparatus of claim 14, wherein the indication on the first module and the indication on the second module include illuminating Light Emitting Diodes (LEDs) disposed relative to one or more ports.

\* \* \* \* \*